(12) United States Patent
Vadasz

(10) Patent No.: US 9,674,117 B2
(45) Date of Patent: Jun. 6, 2017

(54) CELL BASED DATA TRANSFER WITH DYNAMIC MULTI-PATH ROUTING IN A FULL MESH NETWORK WITHOUT CENTRAL CONTROL

(71) Applicant: Istvan Vadasz, Munich (DE)

(72) Inventor: Istvan Vadasz, Munich (DE)

(*) Notice: Subject to any disclaimer, the term of this patent is extended or adjusted under 35 U.S.C. 154(b) by 0 days.

(21) Appl. No.: 14/849,011

(22) Filed: Sep. 9, 2015

(65) Prior Publication Data

US 2016/0191419 A1 Jun. 30, 2016

Related U.S. Application Data

(62) Division of application No. 13/639,911, filed as application No. PCT/EP2011/001771 on Apr. 8, 2011, now Pat. No. 9,154,332.

(51) Int. Cl.
| | |
|---|---|
| *H04L 12/28* | (2006.01) |
| *H04L 12/56* | (2006.01) |
| *H04L 12/933* | (2013.01) |
| *H04L 12/54* | (2013.01) |
| *H04L 12/931* | (2013.01) |
| *H04L 12/70* | (2013.01) |

(52) U.S. Cl.
CPC ...... *H04L 49/1584* (2013.01); *H04L 12/5601* (2013.01); *H04L 49/40* (2013.01); *H04L 2012/5674* (2013.01)

(58) Field of Classification Search
None
See application file for complete search history.

(56) References Cited

U.S. PATENT DOCUMENTS

| | | | |
|---|---|---|---|
| 5,768,283 A | 6/1998 | Chaney | |
| 5,802,054 A * | 9/1998 | Bellenger | H04L 45/745 370/401 |
| 5,978,359 A | 11/1999 | Caldara et al. | |

(Continued)

FOREIGN PATENT DOCUMENTS

| | | |
|---|---|---|
| CN | 101018179 A | 8/2007 |
| EP | 1 018 820 A2 | 7/2000 |

*Primary Examiner* — Edan Orgad
*Assistant Examiner* — Rebecca Song
(74) *Attorney, Agent, or Firm* — Smith, Gambrell & Russell

(57) ABSTRACT

The present invention relates to a computing apparatus as an element of a network structure using a method for acquiring and maintaining cell locked data transfer amongst a number of computing apparatuses. A predefined number of symbols transmitted as a cell is followed by a variable number of idle symbols to ensure the nominally simultaneous start of the cell transfers throughout the network without a central control. At specific positions of the cells each computing apparatus broadcasts a list of its transmission requests and receiver capabilities to all other computing apparatuses. Each of the interconnected computing apparatuses executes the same arbitration procedure based on the identical data set of transmission requests and receiver capabilities. As a result transmission paths are assigned for direct transmission and for payload forwarding. The transmission paths can be assigned per cell period individually for both directions of each link.

7 Claims, 22 Drawing Sheets

(56) References Cited

U.S. PATENT DOCUMENTS

| | | | |
|---|---|---|---|
| 2003/0088682 A1* | 5/2003 | Hlasny | H04L 12/5693 |
| | | | 709/229 |
| 2004/0081079 A1 | 4/2004 | Forest | |
| 2008/0294966 A1 | 11/2008 | Kuroishi et al. | |
| 2008/0310482 A1* | 12/2008 | Covell | H04J 13/10 |
| | | | 375/142 |
| 2009/0102534 A1 | 4/2009 | Schmid | |
| 2011/0225297 A1* | 9/2011 | Archer | G06F 9/526 |
| | | | 709/225 |
| 2013/0142268 A1* | 6/2013 | Gao | H04W 72/04 |
| | | | 375/252 |

\* cited by examiner

| Hierarchical Overview | |
|---|---|
| Hierarchy | Examples |
| Full mesh interconnect | Signaling technology examples:<br>    Differential signal pairs in a backplane<br>    Twisted pair cable interface e.g. CAT5<br>    Optical interface |
| Symbol transmission | Differential signaling encoding examples:<br>    Balanced 8 bit to 10 bit capacitive coupled<br>    Balanced 64 to 66 bit capacitive coupled<br>    Balanced 128 to 130 bit capacitive coupled<br>    Magnetic coupled, encoded like 1000BASE-T |
| Cell locked structure | Clocking and other options:<br>    External 8kHz as timing base<br>    Distribution of 8kHz through the network<br>    Double symbol rate between computing apparatuses 101<br>    Packet embedding via one symbol 222 per cell 601<br>    System management channel via embedded packet |
| Distributed arbitration for payload forwarding | Forwarding options:<br>    Within the cell period 603<br>    In the next cell period 603<br>    Bandwidth controlled priority |
| Higher level protocol queues | Protocol queue examples:<br>    Anonymous, interface to secondary CLN 405<br>    Ethernet<br>    InfiniBand<br>    SAS<br>    SATA |
| Conventional physical interfaces | Physical interface examples:<br>    1000BASE-T, 10GBASE-T, etc.<br>    InfiniBand 1X, 4X, 12X<br>    SAS, SATA<br>    HyperTransport<br>    RapidIO |

Fig. 15

| Assignment of the symbol positions in the cell 601 for an example embodiment | | | | | |
|---|---|---|---|---|---|
| Symbol position | Cell format CF1 702 | Cell format CF2 703 | Symbol position | Cell format CF1 702 | Cell format CF2 703 |
| 1 | C1 | | 501 | C9 | |
| 2-25 | D1-D24 | W1-W24 | 502-525 | D492-D515 | D468-D491 |
| 26 | C2 | | 526 | C10 | |
| 27-50 | D25-D48 | D1-D24 | 527-550 | D516-D539 | D492-D515 |
| 51 | C3 | | 551 | C11 | |
| 52-75 | D49-D72 | D25-D48 | 552-575 | D540-D563 | D516-D539 |
| 76 | C4 | | 576 | C12 | |
| 77-100 | D73-D96 | D49-D72 | 577-600 | D564-D597 | D540-D563 |
| 101 | D97 | W25 | 601 | C13 | |
| 102-125 | D98-D121 | D73-D96 | 602-625 | D598-D611 | D564-D597 |
| 126 | D122 | D97 | 626 | C14 | |
| 127-150 | D123-D146 | D98-D121 | 627-650 | D612-D635 | D598-D611 |
| 151 | D147 | D122 | 651 | C15 | |
| 152-175 | D148-D171 | D123-D146 | 652-675 | D636-D659 | D612-D635 |
| 176 | D172 | D147 | 676 | C16 | |
| 177-200 | D173-D196 | D148-D171 | 677-700 | D660-D683 | D636-D659 |
| 201 | D197 | D172 | 701 | C17 | |
| 202-225 | D198-D221 | D173-D196 | 702-725 | D684-D607 | D660-D683 |
| 227 | D222 | D197 | 726 | C18 | |
| 228-250 | D223-D246 | D198-D221 | 727-750 | D708-D731 | D684-D607 |
| 251 | D247 | D222 | 751 | C19 | |
| 202-275 | D248-D271 | D223-D246 | 752-775 | D732-D755 | D708-D731 |
| 221 | D272 | D247 | 776 | C20 | |
| 222-300 | D273-D296 | D248-D271 | 777-800 | D756-D779 | D732-D755 |
| 241 | D297 | D272 | 801 | C21 | |
| 242-325 | D298-D321 | D273-D296 | 802-825 | D780-D803 | D756-D779 |
| 261 | D322 | D297 | 826 | C22 | |
| 262-350 | D323-D346 | D298-D321 | 827-850 | D804-D827 | D780-D803 |
| 351 | D347 | D322 | 851 | C23 | |
| 352-375 | D348-D371 | D323-D346 | 852-875 | D828-D851 | D804-D827 |
| 376 | W1 | D347 | 876 | C24 | |
| 377-400 | D372-D395 | D348-D371 | 877-900 | D852-D875 | D828-D851 |
| 401 | C5 | | 901 | D876 | W26 |
| 402-425 | D396-D419 | D498-D516 | 902-925 | D877-D900 | D852-D875 |
| 426 | C6 | | 926 | D901 | D876 |
| 427-450 | D420-D443 | D517-D535 | 927-950 | D902-D925 | D877-D900 |
| 451 | C7 | | 951 | D926 | D901 |
| 452-475 | D444-D467 | D536-D554 | 952-975 | D927-D950 | D902-D925 |
| 476 | C8 | | 976 | D951 | D926 |
| 477-500 | D468-D491 | D555-D573 | 977-1000 | D952-D975 | D927-D950 |
| | | | 1001 | W2 | D951 |
| | | | 1002-1025 | W3-W26 | D952-D975 |

Fig. 16

| Assignment of the control symbol positions 805 in an example embodiment for links 221 in the fine alignment state S8 309 and the cell locked state S9 310 ||||
|---|---|---|---|
| Control symbol position | Symbol | Assignment | Common output values for paths in state: |
| | | CF1 702 and CF2 703 | |
| C1 | COM | Cell start symbol 209 | S7, S8, S9 |
| C2 | PST, RST, Data | Packet transmission via this symbol position. See Fig. 19. | S8, S9 |
| C3 | PST, RST, Data | Forward of symbol received at C2 from APP$_{gacpr}$ | S9 |
| C4 | Data | 8-bit signed integer: measured offset 226 of received cell start symbol 219 to own cell start symbol output 209. Value assignment reflects the viewpoint of the transmitting computing apparatus 101<br>0000 0000: optimal alignment<br>0000 0001 – 0111 1111:<br>   Received COM sensed after the own COM<br>   0000 0001: This means an offset of 1 symbol period 225<br>1000 0001 – 1111 1111:<br>   Received COM sensed before the own COM<br>   1111 1111: This means an offset of −1 symbol period 225 | S8, S9 Individual values |
| | | 1000 0000: The coarse alignment state S7 308 is identified for this link 221 and Fig. 18 applies instead of this Table. | S7 |
| C5 | Data | Receiver availability for APP$_1$ ... APP$_8$ | S7, S8, S9 |
| C6 | Data | Forward of symbol received at C5 from APP$_{gacpr}$ | S9 |
| C7 | Data | Receiver availability for APP$_9$ ... APP$_{16}$ | S7, S8, S9 |
| C8 | Data | Forward of symbol received at C7 from APP$_{gacpr}$ | S9 |
| C9 | Data | Requested transmissions to APP$_1$ (bits 7..4), APP$_2$ (bits 3..0) | S9 |
| C10 | Data | Forward of symbol received at C9 from APP$_{gacpr}$ | S9 |
| C11 | Data | Requested transmissions to APP$_3$ (bits 7..4), APP$_4$ (bits 3..0) | S9 |
| C12 | Data | Forward of symbol received at C11 from APP$_{gacpr}$ | S9 |
| C13 | Data | Requested transmissions to APP$_5$ (bits 7..4), APP$_6$ (bits 3..0) | S9 |
| C14 | Data | Forward of symbol received at C13 from APP$_{gacpr}$ | S9 |
| C15 | Data | Requested transmissions to APP$_7$ (bits 7..4), APP$_8$ (bits 3..0) | S9 |
| C16 | Data | Forward of symbol received at C15 from APP$_{gacpr}$ | S9 |
| C17 | Data | Requested transmissions to APP$_9$ (bits 7..4), APP$_{10}$ (bits 3..0) | S9 |
| C18 | Data | Forward of symbol received at C17 from APP$_{gacpr}$ | S9 |
| C19 | Data | Requested transmissions to APP$_{11}$ (bits 7..4), APP$_{12}$ (bits 3..0) | S9 |
| C20 | Data | Forward of symbol received at C19 from APP$_{gacpr}$ | S9 |
| C21 | Data | Requested transmissions to APP$_{13}$ (bits 7..4), APP$_{14}$ (bits 3..0) | S9 |
| C22 | Data | Forward of symbol received at C21 from APP$_{gacpr}$ | S9 |
| C23 | Data | Requested transmissions to APP$_{15}$ (bits 7..4), APP$_{16}$ (bits 3..0) | S9 |
| C24 | Data | Forward of symbol received at C23 from APP$_{gacpr}$ | S9 |

Fig. 17

| Assignment of the control symbol positions 805 in an example embodiment for the links 221 in the coarse alignment state S7 308 ||||
|---|---|---|---|
| Control symbol position | Symbol | Assignment | Common output values for paths in state: |
| C1 | COM | Cell start symbol 209 | S7, S8, S9 |
| C2 | Data | Value P2 from Fig. 19 | S7 |
| C3 | Data | Unassigned | |
| C4 | Data | 1000 0000: This identifies the coarse alignment state S7 308 of this link 221 | S7 |
| C4 | Data | All other values: Fig. 17 applies instead of this Table | S8, S9: Individual values |
| C5 | Data | Receiver availability for $APP_1$ ... $APP_8$ | S7, S8, S9 |
| C6 | Data | Unassigned | |
| C7 | Data | Receiver availability for $APP_9$ ... $APP_{16}$ | S7, S8, S9 |
| C8 | Data | Unassigned | |
| C9 | Data | Value P4 from Fig. 19 | S7 |
| C10 | Data | Unassigned | |
| C11 | Data | Value P5 from Fig. 19 | S7 |
| C12 | Data | Unassigned | |
| C13 | Data | Value P6 from Fig. 19 | S7 |
| C14 | Data | Unassigned | |
| C15 | Data | Value P7 from Fig. 19 | S7 |
| C16 | Data | Unassigned | |
| C17 | Data | Value P8 from Fig. 19 | S7 |
| C18 | Data | Unassigned | |
| C19 | Data | Value P9 from Fig. 19 | S7 |
| C20 | Data | Unassigned | |
| C21 | Data | Value P10 from Fig. 19 | S7 |
| C22 | Data | Unassigned | |
| C23 | Data | Value P11 from Fig. 19 | S7 |
| C24 | Data | Unassigned | |

Fig. 18

| Position in the packet | Assignment and usage | |
|---|---|---|
| P1 | RST: Packet start symbol | |
| P2 | Bits 3..0: GA of this computing unit 101, code 0000 is used if GA=16. | |
| | Bits 7..4: clock quality: Smaller is better | 0000-0100: telco quality, external source |
| | | 0101-1001: telco quality, internal source |
| | | 1010: ± 15 ppm |
| | | 1011: ± 30 ppm |
| | | 1100: ± 50 ppm |
| | | 1101: ± 100 ppm |
| | | 1110: ± 200 ppm |
| | | 1111: ± 300 ppm |
| P3 | Management Bus via I²C protocol emulation | |
| P4 | Bits 3..0: State of connection to $APP_1$ <br> Bits 7..4: State of connection to $APP_2$ | |
| P5 | Bits 3..0: State of connection to $APP_3$ <br> Bits 7..4: State of connection to $APP_4$ | |
| P6 | Bits 3..0: State of connection to $APP_5$ <br> Bits 7..4: State of connection to $APP_6$ | |
| P7 | Bits 3..0: State of connection to $APP_7$ <br> Bits 7..4: State of connection to $APP_8$ | |
| P8 | Bits 3..0: State of connection to $APP_9$ <br> Bits 7..4: State of connection to $APP_{10}$ | |
| P9 | Bits 3..0: State of connection to $APP_{11}$ <br> Bits 7..4: State of connection to $APP_{12}$ | |
| P10 | Bits 3..0: State of connection to $APP_{13}$ <br> Bits 7..4: State of connection to $APP_{14}$ | |
| P11 | Bits 3..0: State of connection to $APP_{15}$ <br> Bits 7..4: State of connection to $APP_{16}$ | |
| P12 | PST: Pre-start symbol | |

Packet content table for the C2 symbol position of the example embodiment, see Fig. 17 and Fig. 18

Fig. 19

| State of the Connections Table for an example embodiment, see Fig. 19 |||
|---|---|---|
| Bits 3..0 and 7..4 | Signal, alignment | Symbol rate checking |
| 0000 | No connection or own GA | No checking result |
| 0001 | Connection detected but no COM detected, State S6 307 | No checking result |
| 0010 | -- not used | |
| 0011 | -- not used | |
| 0100 | Coarse alignment state S7 308 | No checking result |
| 0101 | Coarse alignment state S7 308 | Out of tolerance |
| 0110 | Coarse alignment state S7 308 | Within tolerance |
| 0111 | Coarse alignment state S7 308 | Within 50% of tolerance |
| 1000 | Fine alignment state S8 309 | No checking result |
| 1001 | Fine alignment state S8 309 | Out of tolerance |
| 1010 | Fine alignment state S8 309 | Within tolerance |
| 1011 | Fine alignment state S8 309 | Within 50% of tolerance |
| 1100 | Locked state S9 310 | No checking result |
| 1101 | Locked state S9 310 | Out of tolerance |
| 1110 | Locked state S9 310 | Within tolerance |
| 1111 | Locked state S9 310 | Within 50% of tolerance |

Fig. 20

| Full Functionality Table for an example embodiment GA is the geographic address 106 according to P2 of Fig. 19 ||||||
|---|---|---|---|---|---|
| Control symbol position | bit | Geographic address ga | ga ≠ GA : full functionality of link $L_{GA,ga}$ || ga = GA : $APP_{GA}$ declares itself as timing reference ||
| | | | 0 | 1 | 0 | 1 |
| C5 | 0 | 1 | No | Yes | No | Yes |
| | 1 | 2 | No | Yes | No | Yes |
| | 2 | 3 | No | Yes | No | Yes |
| | 3 | 4 | No | Yes | No | Yes |
| | 4 | 5 | No | Yes | No | Yes |
| | 5 | 6 | No | Yes | No | Yes |
| | 6 | 7 | No | Yes | No | Yes |
| | 7 | 8 | No | Yes | No | Yes |
| C7 | 0 | 9 | No | Yes | No | Yes |
| | 1 | 10 | No | Yes | No | Yes |
| | 2 | 11 | No | Yes | No | Yes |
| | 3 | 12 | No | Yes | No | Yes |
| | 4 | 13 | No | Yes | No | Yes |
| | 5 | 14 | No | Yes | No | Yes |
| | 6 | 15 | No | Yes | No | Yes |
| | 7 | 16 | No | Yes | No | Yes |

Fig. 21

| | |
|---|---|
| Transmission Request Codes for an example embodiment to be applied in the control symbols 805 C9, C11, C13, C15, C17, C19, C21, C23 in Fig. 17 ga is the index of $APP_{ga}$ in Fig. 17 GA is the geographic address 106 according to P2 of Fig. 19 | |
| Binary code bits 3..0 or 7..4 | Assignments for transmission requests to $APP_{ga}$ ga $\neq$ GA |
| 0000 | No transmission requested |
| 0001 | Request to transmit 1 cell |
| 0010 | Request to transmit 2 cells |
| 0011 | Request to transmit 3 cells |
| 0100 | Request to transmit 4 cells |
| 0101 | Request to transmit 5 cells |
| 0110 | Request to transmit 6 cells |
| 0111 | Request to transmit 8 cells |
| 1000 | Request to transmit 10 cells |
| 1001 | Request to transmit 15 cells |
| 1010 | Request to transmit 25 cells |
| 1011 | Request to transmit 40 cells |
| 1100 | Request to transmit 60 cells |
| 1101 | Request to transmit 90 cells |
| 1110 | Request to transmit 130 cells |
| 1111 | Request to transmit 180 cells |
| Bits 3..0 or 7..4 | Assignment if ga = GA |
| Bits 3..0 of gacpr | The geographic address 106 of the computing apparatus 101 which is identified as the cyclic predecessor: $APP_{gacpr}$ |

Fig. 22

CELL BASED DATA TRANSFER WITH DYNAMIC MULTI-PATH ROUTING IN A FULL MESH NETWORK WITHOUT CENTRAL CONTROL

CLAIM OF PRIORITY

The present application is a divisional of U.S. patent application Ser. No. 13/639,911, filed Oct. 8, 2012, which is a National Phase Application of International Application No. PCT/EP2011/001771, filed Apr. 8, 2011, which claims priority to European Patent Application No. 10003 791.0, filed Apr. 8, 2010, and which applications are relied upon and incorporated herein fully by this reference.

FIELD OF THE INVENTION

The present invention relates to a computing apparatus and a method for acquiring and maintaining cell locked data transfer among a number of computing apparatuses which can be full mesh interconnected by full duplex data transfer links and a cell based networking layer providing dynamic multi-path routing, avoiding the need for a central control.

BACKGROUND OF THE INVENTION

Formatted data transfers can be classified as cell transfers and packet transfers. In both cases a sequence of symbols is transferred through a data transmission medium, often called a channel. The symbols are the atomic elements of a transfer protocol, wherein a finite set of symbols is available. The channel can be implemented as a conduit which is able to transport said symbols sequentially from a transmitter to a receiver. Channels may be half duplex or full duplex. A half duplex channel supports unidirectional transfers while a full duplex channel provides transfer capability for both directions.

Cell transfers can be characterized by transferring a predefined number of symbols as an entity, called a "cell". Higher level protocols are required to evaluate symbols transferred within a cell. Packet transfers use an entity with a variable length of symbols, called a "packet", associated with higher level protocols. The data which the application intends to transfer is often called "payload data". Useful sections of payload data may require multiple cells or packets. A protocol is needed in both cases to control the routing of the transmitted payload data through the network. It is also possible to apply an intermediate protocol layer to adapt the cell transfer architecture as a carrier for packet transfers. Electronic elements of a transmission link are often called "signals".

Cell transfers often rely on so called out-band signaling, in which case payload data is transferred in one subset of signals of the physical link and cell structuring information as well as routing information are transferred via other signals of the physical link. In typical cases a symbol clock and possibly also cell start information is provided from a central resource via conduits other than those used for the data transfer itself. Since high speed differential signaling is used in plenty of applications, out-band signaling appears to be old-fashioned. Out-band signaling may require an excessive number of connector contacts on the involved electronic components or modules.

Cell transfers have a basic advantage that the storage of a cell requires always the same buffer size. On the other hand, payload data mostly does not match the cell size and therefore some bandwidth may be wasted.

The predefined size, also called "length" of the cell may vary from a few bytes to kilobytes in different cell transfer architectures. Cell transfers are often based on a synchronous interconnection of participants while most packet transfer protocols do not need a synchronization of the connected modules.

Cell based and packet based networks are often implemented so that the clients are connected to a central service called the switch instead of direct connections. The switch receives data in the form of cells or packets and resends it towards a target client. In certain cases synchronization and arbitration of the transfers are also provided by the central resource.

A switch, whether serving a cell transfer or a packet transfer network, inherently limits the number of connectable clients as well as the length of a cell or packet, respectively. There are always limits of technology to increase the bandwidth of the switch and also of the number of the data transfer links they support. There is also an ongoing effort to increase the data transfer capability of the conduits to ever higher values. At a given technology level switches used in parallel is the last and most expensive way to increase the performance of a network. An alternative is to include switches into each of the network participants and eliminate the need for dedicated switch components. Network participants equipped with a switch provide direct interface links to a number of network participants, ultimately utilizing the so called full mesh topology where each network participant has a direct connection link to each other network participant. Both central switching based and full mesh based solutions have limits of practicability. Full mesh networks are usually implemented for up to sixteen network participants.

In the case of full mesh networks a direct connection is installed between each pair of network participants, and each network participant is equipped with a switch function which provides links to all other network participants and to the local structure. An ideal implementation provides data switching service so that data can be transferred between two network participants via multiple routes simultaneously. Since the required bandwidth between the pairs of network participants may be extremely variable, high bandwidth data transfers can be realized utilizing the transfer capabilities via links which are momentarily not used by the directly attached components. The asserted possibility of adding a switch to each of the networked units appears as a simple task in hardware terms. It is however a highly complex task for the software to distribute the data streams via dynamically changing paths or even multiple paths in parallel. Therefore state of the art network solutions prefer central switching and call for the highest possible bandwidth to the switch.

For a network with dynamic data transmission path assignments it is a fundamental advantage if cells of uniform length and not varying length packets are used. For cell transfer structures in a large network using a common cell size within the network, the relative timing of the cell transfer periods is an important aspect. The easiest structure to handle is the totally synchronous case. This is however only available if central clocking control is used, whereas central control as well as outband signaling have several detriments as stated above.

Very large networks cannot be centrally clocked, so they live with jitter and wander effects. Nevertheless such structures remain useful, even if complete cells need to be dropped if due to the slightly diverging clock speeds the cell offset exceeds the allowed limit.

For system level networking, cell transfer periods need to be aligned and locked across the network. This can be seen as a prerequisite for cell content forwarding.

In small networks, mostly implemented within a shelf with interconnections provided via a backplane, the technique of synchronous cell transfers does exist, but most up-to-date implementations prefer packet based transfers like Ethernet, InfiniBand, Serial RapidIO, or Serial Attached Small Computer System Interface (SAS).

For a cell transfer based network the advantage of the synchronous implementation is huge. There is a challenge though with such implementations. The source of the synchronicity is a specific clocking module. The clocking module transmits a clock signal towards all network participants. Highly reliable systems need dual redundant sourcing of the clock. The redundant clock sourcing as well as the usage of redundantly available clocks are complex parts of existing implementations.

Existing packet transfer technology inserts a controlled number of SKIP symbols between packets so as to ensure that in packet forwarding chains overflow or underflow conditions can be avoided.

In the PICMG 3.0 ® AdvancedTCA® specification full mesh interconnects for the backplane are defined, but with existing protocols it is complex and cost intensive to utilize the excessively high bandwidth capability of this interconnect architecture. One of the advantages of the full mesh interconnect is, that the two slots which are otherwise occupied by the central switching resources are available for any type of so called mesh enabled boards.

SUMMARY OF THE INVENTION

It is an object of the present invention to provide a nominally simultaneous start of cell transfers throughout a network structure without requiring a central control.

It is another object of the present invention to provide replicated arbitration for resources in apparatuses which disseminate request and capability messages in a synchronized network.

The framework of the present invention provides a synchronous cell based network communication amongst computing apparatuses dynamically utilizing multiple paths in a full mesh network without requiring a central control. A first aspect establishes a synchronous infrastructure across the network while a second aspect exploits the potential of a network via global dissemination of request and capability information, as well as a replicated arbitration which generates the assignments of resources for the data transmission. The two aspects are interlinked in service of the framework.

Embodiments are directed to a computing apparatus which can be interconnected in a network structure via conduits providing bidirectional links for independent streams of symbols in both directions, wherein one specified symbol identifies the beginning of a cell comprising a contiguous sequence of a predefined number of symbols, and each of said computing apparatuses is adapted to transmit a locally controlled number of idle symbols before the start of the a subsequent cell, the number of said idle symbols having an allowed range for adjustment purposes between predefined lower and upper limits.

Idle symbols may be transmitted after the last symbol of a cell or inserted at arbitrary positions between symbols which comprise a cell, but in this case specific symbols predefined for the idle symbol function need to be used.

Idle symbols may be substituted by an increase of the symbol period which extends the cell period by one symbol period per replaced idle symbol.

Furthermore, the computing apparatus may start its cell transmissions to all or at least some connected computing apparatuses simultaneously. Each computing apparatus can be identified with a natural number from 1 to a predefined maximum number of the computing apparatuses. Then, each computing apparatus may transmit its identification number at least once to each connected computing apparatus.

The computing apparatus measures for each received cell start symbol the timing offset relative to the computing apparatus's own transmitted cell start symbol in units of its own symbol period, including the positive or negative direction of the offset, and the computing apparatus may periodically transmit the measured timing offset between the transmitted cell start symbol and the received cell start symbol to the connected computing apparatus to which the measurement is related. More specifically, one or more symbol positions within a cell may be assigned to transmit the timing offset measurement data or information.

In a specific implementation, all computing apparatuses periodically transmit the mutually relevant timing offset measurement information to all connected computing apparatuses.

According to another aspect, a computing apparatus calculates the difference between its own cell start timing offset and a received timing offset for each connected computing apparatus. The timing offset differences can be used by the computing apparatus to improve the alignment of its cell transmission start to a majority of the connected computing apparatuses' cell transmission starts by using said timing offset differences in the determination of the number of idle symbols to be transmitted before the start of the subsequent cell. Optionally only a subset of connected computing apparatuses may be considered for a computation or determination of the number of idle symbols to be used. Here, a unique identification code allocated to each computing apparatus may be used to build the subset of computing apparatuses which is used as a basis for the decision for the improvement of the cell transmission start alignment.

The computing apparatus may generate a cell synchronization state information for each of its links. In this case, the computing apparatus may transmit a set of cell synchronization state information of its links periodically to each of the connected computing apparatuses, encoded in predefined symbol positions and as assigned according to the numerical order of the connected computing apparatuses' unique identification number. The computing apparatuses may then save or evaluate cell synchronization state information received from each connected computing apparatus. It may for example use the cell synchronization state information received from the connected computing apparatuses to compute the number of the required idle symbols to be transmitted ahead of the next cell start symbol. The midpoint of the specified lower and upper limits of the number of idle symbols may be defined as a default value for the number of idle symbols. The number of idle symbols applied may for example be controlled to gravitate towards a defined default value. As an additional option, the corrective change in the number of the applied idle symbols may be controlled so that the midpoint between the highest and the lowest number of applied idle symbols does not deviate by more than a specified value from the default value for the number of idle symbols. Optionally, a computing apparatus may rely on the cooperative behavior of another computing apparatus and may let that computing apparatus apply a required corrective change in the number of the applied idle symbols. In a specific implementation, the number of idle symbols transmitted between the cells could be calculated so that within a fine aligned or locked subset of computing apparatuses the midpoint between the first and last cell starts is identified and the applied number of idle symbols shifts the own cell start towards that midpoint.

According to another specific aspect, the computing apparatus may declare via its cell synchronization state information that a specific link is available for data transmission when it identifies a small enough timing offset between its cell start symbol and the respective connected computing apparatus's cell start symbol.

According to a further specific aspect, the computing apparatus may disseminate a request to all other computing apparatuses in the network to collectively increase or decrease the number of the idle symbols so as to maintain a cell locked state and observe several requirements to the number of the applied idle symbols.

The number of symbols per cell may be defined as a result of a negotiation of the connected computing apparatuses during an initialization period.

Furthermore, each computing apparatus may be connected to each other computing apparatus with a dedicated conduit.

Embodiments are directed to an apparatus comprising communication interfaces, resources, and an arbiter, having capabilities for active and passive communication via said communication interfaces to other apparatuses with a substantially identical communication behavior and a substantially identical arbiter interconnected in a network wherein subdivisions of time are identified by said apparatus as activity periods wherein it is granted that any two messages issued by an apparatus within one activity period are received by any other apparatus within one activity period, said apparatus optionally having the capability to forward received communication elements to other apparatuses within the activity period of their issuance, said resources having two or more statuses, said apparatus having the capability to disseminate request and status messages, the latter carrying information about the current and/or future status of said resources, said messages being disseminated so that the apparatuses in said network will have received each of said messages from each other apparatus within the activity cycle of their issuance, further within the same activity cycle said transmitted and received messages are evaluated by said arbiter in each of said apparatuses identically, computing status assignments for the subsequent activity cycle or cycles, said apparatus extracting the status assignments of its resources for the subsequent activity cycle exclusively from the arbitration results of its own arbiter.

According to another aspect said apparatus may be a computing apparatus which can be interconnected in a network structure, the communication means may be realized via conduits providing bidirectional links, the active and passive communication may be carried by independent streams of cells, said cells comprising a predefined number of symbols, all cell transmissions in the network aligned resembling said activity cycles, the cells starting within a time period short enough to allow the synchronous evaluation of the symbols transmitted within a cell period, at specific positions of the cells each computing apparatus may broadcast request messages comprising a list of transmission requests and status messages comprising a list of receiver capabilities and of unavailable resources to all other computing apparatuses, each of the interconnected computing apparatuses executing the same arbitration procedure based on the identical data set of transmission requests, receiver capabilities, and unavailable resources as a result resource statuses may be set wherein paths may be assigned for direct transmission and computing apparatuses may be assigned as forwarding agents together with resource status assignments for the paths from requester to forwarding agent and from forwarding agent to target, the paths being the directed components of the links.

It is noted that the second aspect of the invention does not exclude central control, and said activity cycle may therefore be derived from a central control. On the other hand, said cell locked state when established according to the first aspect of the invention can be implemented to fulfill the requirement for alignment according to said activity cycles for the second aspect of the invention. Said "cell locked state" is being used as a synonym for "aligned according to the requirements for activity cycles" throughout this document.

According to another option, the computing apparatus may retransmit a subset of the received symbols to one or more other computing apparatuses during the same cell period at specified higher numbered symbol positions, thereby accomplishing the forwarding of payload contents of a cell. Moreover, a computing apparatus may receive and store state and payload data during one cell period and may retransmit these or parts of these data during a subsequent cell period to other connected computing apparatuses. Then, a subset of the symbols which follow the last of the symbols subject to be retransmitted can be utilized for a packet protocol. As an alternative or additionally, in a cell which contains retransmitted symbols, a subset of the symbols preceding the first retransmitted symbol could be utilized for the packet protocol. As a further alternative or additionally, the symbols which are transmitted or retransmitted via the cell locked network from one computing apparatus to another can be utilized for a packet protocol, a storage interface protocol or any other higher level protocol. Control symbols or groups of control symbols may be assigned to equidistant positions within the cell, so that the retransmission of data symbols can be accomplished at a constant offset for each data symbol.

Furthermore, the source computing apparatus's identification might not be transmitted together with payload data to the target computing apparatus, but the target computing apparatus may extract this information from the arbitration results.

The arbitration procedure may assign one transmission request to the direct connection path from the source to the target computing apparatus and may assign the remaining transmission requests via an algorithm which allocates forwarding agent computing apparatuses with an otherwise unused data input path from the source computing apparatus and data output path towards the target computing apparatus. In this case, the arbitration procedure may compute payload forwarding path assignments in a cyclic sequence with each step assigning a different forwarding agent computing apparatus to each transmission requester computing apparatus. If a path is configured to transmit multiple cells per cell period the arbitration procedure may assign several transmission requests between the same source and target computing apparatuses to the same transmission path in one step, to thereby accelerate the arbitration process. Alternatively, the arbitration procedure may assign a maximum possible number of transmission requests between the same source and target computing apparatuses to the same transmission path in one step, to thereby accelerate the arbitration process.

Transmission paths which are able to carry multiple cells during a cell period could then be assigned with a preference.

Some or all computing apparatuses may be interconnected with links comprising more than one lane and the additional lanes may be used for simultaneous transmission of additional cells between respective connected computing apparatuses.

When more than one data path is assigned from a requester to a target computing apparatus a convention needs to be established which governs the sequential assignment of said data paths.

Several packet protocols assigned over the cell transmission layer can coexist in the network. Additionally, one or more interfaces to packet protocols may be provided in the network, while the interface may appear only within a component or building block of the network.

In a specific implementation the computing apparatus may measure the time period for a predefined number of symbols received from a connected computing apparatus in units of its own symbol period. The computing apparatus may then transmit the measurement results to other computing apparatuses in the network, which may then for example use these measurement results for the detection of a failure.

According to still further aspect, the synchronized computing apparatuses may apply a cell sequence numbering scheme, wherein for example at least some cells may contain the sequence number.

In a specific implementation, the symbols applied between the last symbol of a cell and the first symbol of the subsequent cell may be used for transmission of control information or optional payload data.

According to a still further aspect, an external clock may be distributed within the network by a computing apparatus which has connection to an external clock source, wherein the computing apparatus may identify via predefined symbol positions the cell and the symbol position relative to the cell start symbol which matches the relevant edge of the external clock. The cell cycle, which is the sum of the number of the symbols comprising the cell and the constant number of idle symbols applied between a cell and a subsequent cell, may be selected so that the external clock period is an integer multiple of the cell cycle. The clock timing information may be transmitted in only a subset of the transmitted cells or may be transmitted spread over multiple cells. A computing apparatus may forward clocking information of another computing apparatus via its own transmitted cells. Furthermore, a connected computing apparatus may disseminate information about the clock quality level of its external reference clock source.

According to a still further aspect, one or more symbol positions of a cell may be assigned to a packet protocol, so that the symbols of a transmitted packet are distributed to the assigned symbol positions of subsequent cells. More specifically, low level information may be distributed in the packets periodically, so that one predefined symbol position in the cells is sufficient for the dissemination of a multitude of constant or low bandwidth data.

According to a still further aspect, subsets of links may be operated at multiples of a basic symbol rate. In a specific implementation, a link may be operated at a multiple of N of the basic symbol rate, so that N symbols are transmitted within one symbol period of the basic symbol rate. In this case, the subsequent N symbols transmitted during the symbol period number K at the basic symbol rate within the cell period may be associated to the symbols number K of each of N individual cells. Here, the symbols of the N cells may be transmitted interleaved per symbol position. The computing apparatus may acquire information about the specified symbol rate multiplication factor for its links from an external resource depending on its identification number. The first symbol stream or any other specifically identified symbol stream may provide the symbols assigned for initialization and maintenance of cell synchronization.

According to another aspect, embodiments may include a memory device comprising:
  a storage array where storage locations can be written to in a cyclic addressing sequence and read from in at least one separate identically directed cyclic addressing sequence;
  an address register for an address to said storage array which is loaded with the current address output of a write address generator upon a triggering event in phase with a writing sequence and the content of said address register used as a source of a preload to a read address generator to said storage array, the preload being applied upon an event timed in phase with a reading sequence.

According to a still further aspect, an event synchronizer may be provided in the above memory device, which synchronizes the triggering event from the writing side towards the reading side of the storage array. The memory device may for example be used in several instances in parallel where the preload of the read address generators for each of the instances could be triggered simultaneously.

According to a still further aspect, the write address generator and the read address generator may produce their cyclic addressing sequence according to an identical scheme with changing exactly one bit of the address code per addressing step, including the step when the addressing cycle wraps around but excluding the step when the read counter is preloaded.

According to another aspect a network structure may comprise a plurality of networked computing apparatuses as defined above, an evaluation may be applied amongst symbols transmitted and received in one cell period to emulate a serial transmission of bits of data codes carried by said symbols, the emulated serial transmission being achieved via an open collector bus interconnection, wherein said emulation is implemented so that each computing apparatus individually evaluates the symbols received from each computing apparatus at a specified symbol position so that a bit for bit sequential evaluation of the symbols starting with the most significant bit position grants priority to data with a predetermined bit value or bit pattern identified in a checked sequence, the checking being continued bit by bit until only one transmitter is identified having the priority, and the data from this transmitter being the result of this symbol transmission, wherein transmission of a defined non-data symbol at a specific symbol position can be used as a delay, and wherein all symbols at this specific symbol position of the current cell are ignored.

An embodiment may be directed to a method of transferring data in a network structure having one or more computing apparatuses with a substantially identical interface to the network via conduits providing bidirectional links for independent streams of symbols in both directions, wherein said method comprises: providing one specified symbol, a cell start symbol, to identify the beginning of a cell comprising a contiguous sequence of a predefined number of symbols; transmitting from one of said computing apparatuses a locally determined number of idle symbols before the start of the subsequent cell, the number of said idle symbols having an allowed range for adjustment purposes between predefined lower and upper limits, the insertion of an idle symbol being substitutable by a dynamical change to the symbol period so that the time period of the cell transmission is extended by the time period of the substituted idle symbols; transmitting said cell start symbol simultaneously to all connected computing apparatuses; and applying the same number of said idle symbols to each of them.

An embodiment may be directed to a method of transferring data in a network structure having one or more computing apparatuses with a substantially identical interface to the network via conduits providing bidirectional links for independent streams of symbols in both directions, wherein said method comprises: providing said computing apparatuses with a substantially identical communication behavior and a substantially identical arbiter; identifying subdivisions of time as activity periods; receiving within one activity period any two elements of active communication issued within one activity period by a computing apparatus in said network; forwarding received communication elements to other apparatuses in said network within the activity period of their issuance; determining a status or status sequences for a subsequent activity cycle; disseminating request messages and status messages which inform about the status and/or future status of resources, said messages being disseminated so that the computing apparatuses in said network will have received each of said messages from said apparatus within the activity cycle of their issuance; using the content of said disseminated request and status messages as an input; computing the statuses or status sequences for the subsequent activity cycle or cycles for all resources of all apparatuses in said network; extracting status assignments of own resources for the subsequent activity cycle exclusively from the results of an own arbitration, said arbitration being performed in each activity cycle.

According to another aspect the computing apparatus may appear as a data set for a computer program describing the behavior of the computing apparatus and/or as a source data set which may be converted into a data set representing a physical instantiation of the computing apparatus targeted to a specific manufacturing technology. The targeted technology may be a programmable logic device (PLD) in which case the data set may appear as a bit stream used for the configuration of said PLD.

According to another aspect a computer program may carry out the steps of the specified methods by code means.

Further advantageous modifications are defined in dependent claims.

BRIEF DESCRIPTION OF THE DRAWINGS

The present invention will now be described based on embodiments with reference to the accompanying drawings in which:

FIG. 15 shows a table with a hierarchical view of relevant items in computing and networking systems;

FIG. 16 shows a table of assignments for symbol positions in a cell for an example embodiment;

FIG. 17 shows a table of assignments of control symbol positions for a cell locked state and a fine alignment state in an embodiment;

FIG. 18 shows a table of assignments of control symbol positions for a coarse alignment state in an embodiment;

FIG. 19 shows a table of packet contents for an embodiment;

FIG. 20 shows a table of the state of connections encoding for an embodiment;

FIG. 21 shows a table of bit encoding for the full functionality of links for a transmitting computing apparatus in an embodiment; and FIG. 22 shows a table for transmission request codes in an embodiment.

DESCRIPTION OF THE EMBODIMENT

In the following, embodiments of the present invention will be described based on a cell locked data transfer among a number of computing apparatuses 101 which can be full mesh interconnected by full duplex data transfer links.

Some embodiments are based on two concepts which together open up perspectives for high networking performance and versatility. The first concept creates a cell locked network (CLN) 410 which is a cell based synchronized multi-path data transport architecture across a full mesh network 105, without out-band signaling and without central control. The second concept produces an automatic assignment of the data transport requests to data paths for each cell period 603, enabling a hardware controlled dynamic multi-path routing in the cell locked network 410.

Figure 1:
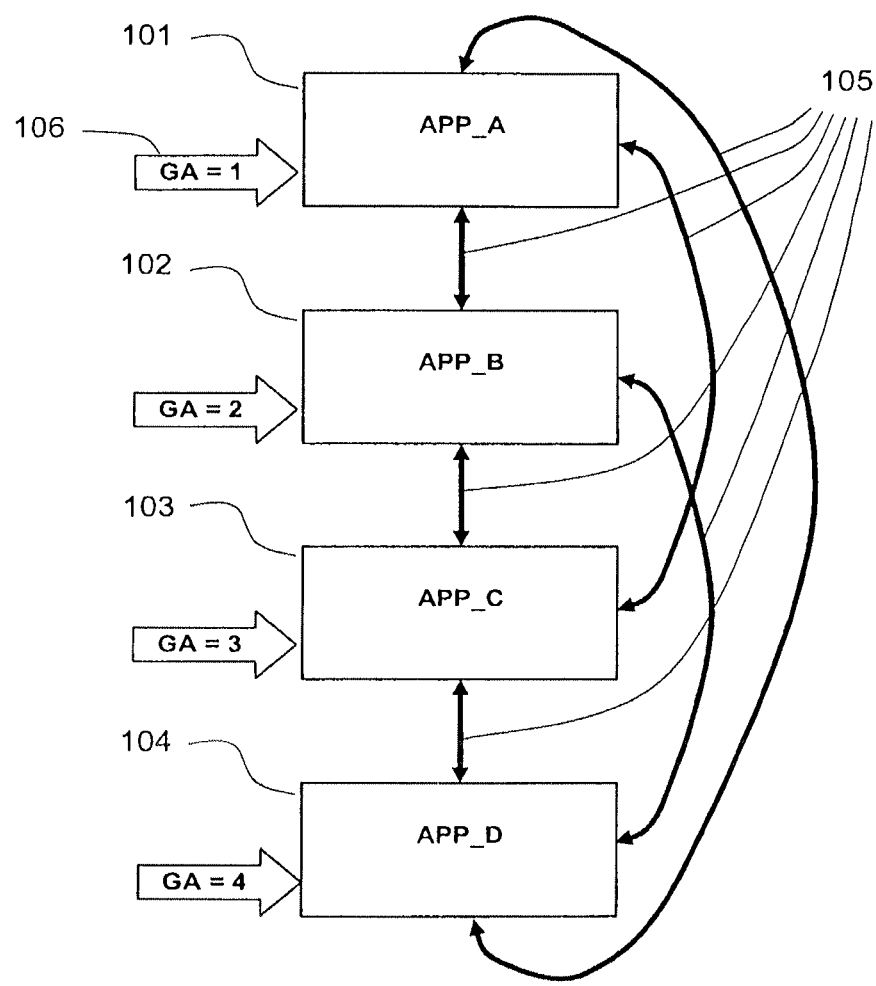
FIG. 1 shows a schematic diagram indicating a network architecture in which the present invention can be implemented.

A number of computing apparatuses 101 are interconnected by full duplex point-to-point links 221. Said computing apparatuses 101 are interconnected so that a direct connection link 221 is available between any two computing apparatuses 101. Such a topology is also called a full mesh interconnect topology. FIG. 1 shows an example for a full mesh interconnect topology of four computing apparatuses APP_A 101, APP_B 102, APP_C 103, and APP_D 104.

The term computing apparatus 101 is used here to cover computers, storage entities, input/output nodes or any other component connected to the subject network of the embodiment which is the cell locked network 410.

In an implementation of the link 221, a serial bit stream with embedded clock may be used. Generally, the link 221 can be any conduit providing a data transport medium for symbols 222 in both directions. The symbols 222 represent data, framing, and other control as appropriate.

A computing apparatus 101 can be equipped with a resonator and generates clocking within a predefined frequency tolerance. The data transmission clock frequency, which is the basis for the symbol transmission rate, can be derived from the frequency of a resonator or the like. The resonators and clock generators can be local to each computing apparatus 101, wherein the computing apparatuses 101 transmit symbols 222 at nominally identical but slightly different individual symbol rates. Due to environmental conditions, the symbol transmission rates may also change dynamically within the resonator's tolerance.

Each computing apparatus 101 in the cell locked network 410 has a unique address assigned which is called a geographic address 106. If an embodiment of the invention supports a maximum of N computing apparatuses, then the geographic address 106 is a natural number in the range of 1 through N. Each of the interconnected computing apparatuses 101 can be identified in the cell locked network 410 by its geographic address 106. The geographic address 106 can be assigned to the computing apparatuses e.g. via coding pin connections specifically configured per slot within a rack-mounted system, via setup jumpers if free standing computing apparatuses are interconnected. During the initialization period of a link 221 a computing apparatus 101 includes its geographic address 106 in at least some of the transmitted cells 601, and the computing apparatus 101 at the other end of the link 221 does this, too. This allows the mutual identification of the connected computing apparatuses with their geographic addresses 106 for each of the links 221.

Figure 6:
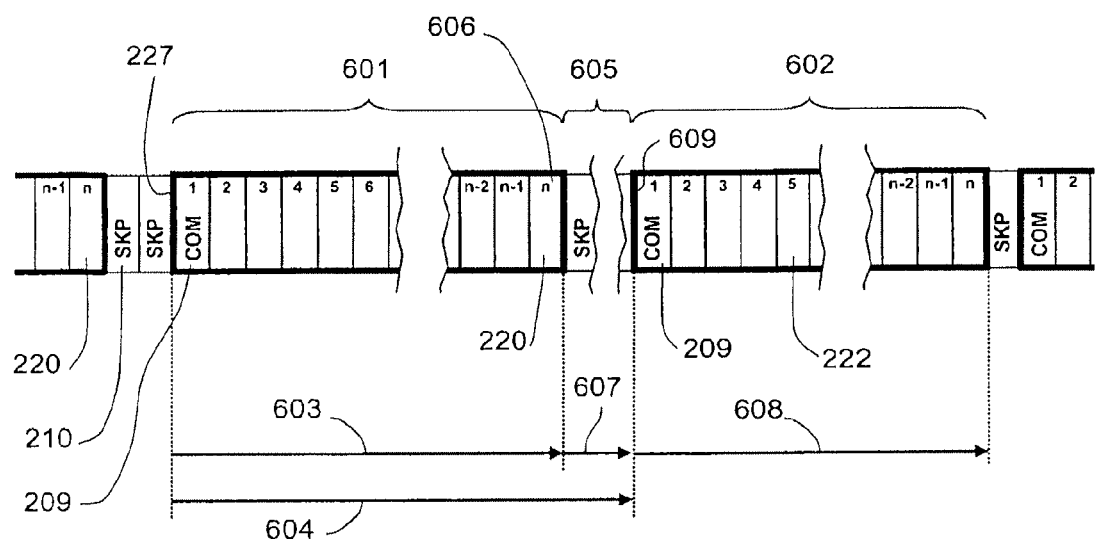
FIG. 6 shows a structure of a transmitted stream of symbols.

FIG. 6 shows a structure of a transmitted stream of symbols. Each of the computing apparatuses transmits symbols 222 at its symbol rate continuously towards all other connected computing apparatuses. The transmitted stream of symbols 222 is structured into cells 601 by a unique cell start symbol 209 applied at the beginning of each cell 601.

The cell 601 is defined as a sequence of a predefined number 606 of symbols 222, starting with the cell start symbol 209. The last symbol of the cell 220 may be followed by a small number of idle symbols 210 before the subsequent cell 602 starts.

The number of symbols per cell 606, the default number 605 of idle symbols 210 as well as the minimum and maximum number of idle symbols 210 are specified in the embodiment.

A computing apparatus 101 executes its transmissions with the same timing towards all connected computing apparatuses. It transmits the cell start symbol 209 to all connected computing apparatuses at the same time, then the remaining symbols 222 of the cell 601 and after the last symbol 220 of the cell 601 an identical number of idle symbols 210.

Since each computing apparatus 101 acts based on its local timing, the timing of the transmission of the cell start symbols 209 is different per computing apparatus 101.

The transmission delay 224 is typically different for each link 221 and typically unknown for the structure setup. The transmission delay 224 is considered to be nominally identical in both directions of the same link 221. The transmission delays 224 stay with a small tolerance at a constant value. For the operation of the cell locked network 410 the symbol transmission delays 224 are significantly shorter than the cell period 603, but they may extend to several symbol periods 225.

So as to maintain synchronous cell 601 transmissions in the cell locked network 410, dynamic adjustment capability is required on each of the computing apparatuses. The number of the transmitted idle symbols 210 is determined for each cell cycle 604 in each computing apparatus 101 independently to provide this dynamic adjustment capability. For the achieved structure of synchronous cell 601 transmissions, that is when the cell locked state 310 has been established on the links 221, we call the cell locked network 410 cell locked.

There are several possible ways for computing apparatuses to determine the number of the idle symbols 210 to be applied for achieving and maintaining the locked state, and the embodiments shall not be limited to a specific algorithm. For the definition of a default number 605 of idle symbols the optimal value can be calculated based on the number of symbols per cell 606 and the tolerance value of the symbol rate. The default number 605 of the idle symbols has to enable corrective changes by inserting more or less idle symbols 210.

Each computing apparatus 101 is equipped with a structure which measures the offset 226 between its own transmitted cell start symbol 209 and the received cell start symbol 219 for each implemented link 221. The offset 226 is determined by counting the number of the computing apparatus's 101 own symbol periods 225 between the transmitted cell start symbol 209 and the received cell start symbol 219. A zero value of this offset 226 measurement means that a received cell start symbol 219 was measured as simultaneous with the computing apparatus's 101 own transmitted cell start symbol 209. A positive value means that the received cell start symbol 219 was sensed after the transmitted cell start symbol 209 while a negative value means that the received cell start symbol 219 was sensed before the own transmitted cell start symbol 209. The method of the measurement as well as the assignment of positive and negative values is an implementation detail which shall not constrain the scope of the invention.

Each computing apparatus 101 is equipped additionally with a capability to transmit the measured cell start offset value 226 of a link 221 to the computing apparatus 101 connected via the link 221. The measurement data is encoded into symbols 222 and transmitted at defined symbol positions of the cell 601.

Figure 2:
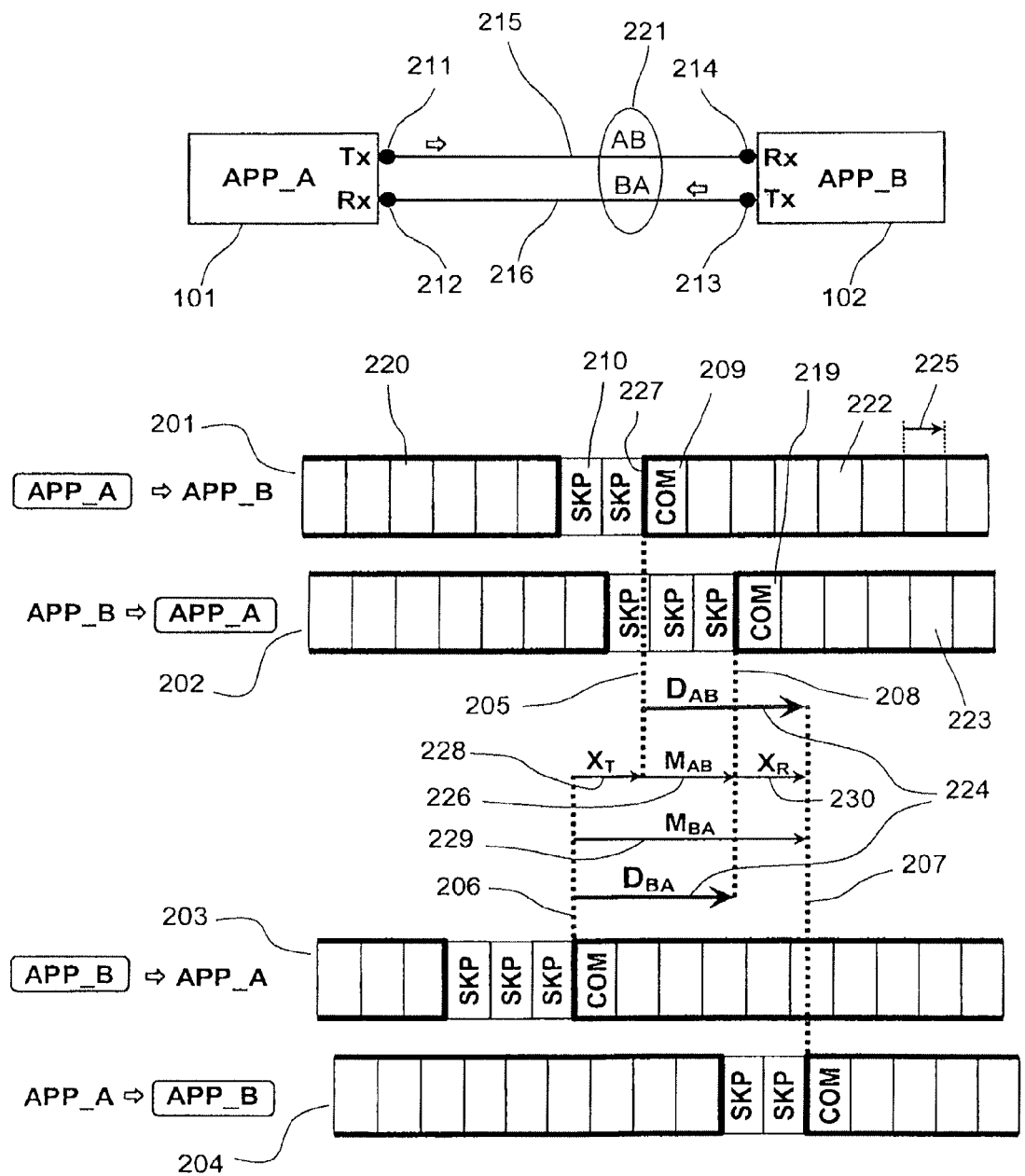
FIG. 2 shows an example of the bidirectional link between computing apparatuses.

FIG. 2 shows an example of the bidirectional link 221 between computing apparatuses APP_A 101 and APP_B 102. In this example the link 221 is already in the cell locked state 310.

An overview is shown at the top of FIG. 2. APP_A 101 is connected to APP_B 102 via a link 221 which consists of two directed data transmission paths: AB 215 and BA 216. Symbol sequence timing samples are shown for measurement points as follows:

Symbol sequence 201 at measurement point 211
Symbol sequence 202 at measurement point 212
Symbol sequence 203 at measurement point 213
Symbol sequence 204 at measurement point 214

Symbol sequence 201 is transmitted by APP_A 101 to APP_B 102 via the path AB 215. In this sample APP_A 101 transmits the final symbols 222 of a cell 601 followed by two SKP (Skip) symbols which represent the idle symbols 210. The subsequent cell 602 starts with a COM (Comma) symbol which represents the cell start symbol 209. The empty boxes represent additional symbols 222 which are not explained here.

The symbol sequence 202 received by APP_A 101 is identical to the symbol sequence 203 which APP_B 102 transmitted, but it is delayed by $D_{BA}$ 224 due to the signal transmission delay in the connection path BA 216.

The symbol sequence 203 is transmitted by APP_B 102 to APP_A 101 via the path BA 216. APP_B 102 transmits three SKP symbols 210 before starting the next cell 601.

The symbol sequence 204 arriving at APP_B 102 was transmitted by APP_A 101, so it appears as a delayed version of 201 delayed by $D_{AB}$ 224.

Symbol sequence timings 201 and 202 are visible only for APP_A 101, whereas symbol sequence timings 203 and 204 are visible only for APP_B 102.

FIG. 2 shows coordinates for the time of the cell start symbol 209 transmission 205 by APP_A 101, the time of the cell start symbol 209 transmission 206 by APP_B 102, the time 207 when the cell start symbol 209 from APP_A 101 arrives at APP_B 102, the time 208 when the cell start symbol 209 from APP_B 102 arrives at APP_A 101.

$D_{AB}=D_{BA}$ 224 is the delay of the AB path 215 and the BA path 216 respectively, which have been defined to be nominally equal.

$M_{AB}$ 226 is measured in APP_A 101 as the offset value of the cell start symbol 219 received from APP_B 102.

$M_{BA}$ 229 is measured in APP_B 102 as the offset value of the cell start symbol 219 received from APP_A 101.

$X_T$ 228 is the timing offset of APP_A 101 relative to APP_B 102 at the time of their transmission of the cell start symbol 209.

$X_R$ 230 is the timing offset of APP_A 101 relative to APP_B 102 at the time of their receiving the cell start symbol 219 from the respective other computing apparatus 101.

APP_A 101 is aware of its own measurement of $M_{AB}$ 226.

APP_B 102 transmits its measurement value $M_{BA}$ 229 to APP_A 101 encoded in a defined symbol position.

Using $M_{AB}$ 226 and $M_{BA}$ 229 APP_A 101 is able to find decisions for the number of idle symbols 210 to apply.

From $D_{AB}=D_{BA}$ and $X_T+D_{AB}=D_{BA}+X_R$ $\Rightarrow X_R=X_T$

And from $X_T+M_{AB}+X_R=M_{BA}$ with $X_R=X_T$ $\Rightarrow 2*X_T=M_{BA}-M_{AB}$ So as to achieve $X_T\approx 0$ the difference of the received and the measured offset value for the connected computing apparatuses 101 needs to be approximated to zero. This needs to be done to achieve and maintain cell locked state 310 for the link 221 which connects the computing apparatuses APP_A 101 and APP_B 102.

The scenario is more complex when multiple computing apparatuses 101 are connected in the full mesh topology 105. Two ways are shown here to maintain the cell locked state in this scenario.

The first way is as follows. One specific computing apparatus 101 is considered to be the timing reference for all others, and all other computing apparatuses 101 make adjustments according to the above described principle, while the computing apparatus 101 which is considered as a reference always applies the default number 605 of idle symbols. The already mentioned possibility to identify the interconnected computing apparatuses 101 in the cell locked network 410 by using geographic addresses 106 allows e.g. to define the computing apparatus 101 with the smallest geographic address 106 as the timing reference for the synchronization of the cell locked network 410. A computing apparatus 101 which declares to be the timing reference disseminates this information in each cell 601. It should be avoided that more than one computing apparatus 101 considers itself to be the timing reference, as a transient situation this is of no concern, though.

The second way is as follows. A computing apparatus 101 compares the timing of its cell start symbol 209 with the cell start symbol 209 of all connected computing apparatuses 101 by calculating the difference $M_{AB}-M_{BA}$ for each of them, using measured offset 226 data and the received offset 229 information. The list of these differences provides the chronology of the cell starts 227 relative to the computing apparatus's 101 own cell start 227 which is zero. The set of the list elements together with the zero has a minimum value and a maximum value corresponding the earliest and the latest cell start 227. The midpoint between the earliest and the latest cell start 227 is the target of the alignment. Since the own cell start 227 has the value "0", the midpoint's value tells the right direction for the required deviation from the default number of idle symbols 605 but the value must be chosen so that it remains between the minimum and maximum number allowed for the idle symbols 210. The calculation is described later in an embodiment.

The aforesaid is now summarized with a concise definition for the cell locked network 410.

Interconnected computing apparatuses 101 transmit symbols 222 at a specified symbol rate within a defined tolerance. The computing apparatuses 101 are interconnected with links 221 for the transmission of symbols 222 in both directions, with nominally matching delays of the paths AB 215 and BA 216 for the two directions. The delay of the links 221 connecting the computing apparatuses 101 may diverge significantly but must not exceed a defined maximum. Cells 601 are specified as a defined length sequence 606 of symbols 222 starting with a unique cell start symbol 209. The cell locked state is established if the following conditions persist. Each computing apparatus 101 transmits cells 601 simultaneously to the computing apparatuses 101 which are connected to it via the links 221, and the cell 601 transmissions generated by the different computing apparatuses 101 are started within a certain time period which is significantly shorter than the cell period 603. After each cell 601 transmission a number of idle symbols 210 are transmitted. A computing apparatus 101 transmits the same number of idle symbols 210 on all links 221 but different computing apparatuses 101 may apply different numbers of idle symbols 210. The number of the applied idle symbols 210 can be the defined default number 605 or another number if that improves the synchronicity of the next cell transmission start 227 for a majority of the connected computing apparatuses 101. This method dynamically corrects deviations of the cell start 227 caused by the slightly different symbol rates of the connected computing apparatuses 101.

An example for finding the proper value for the default number of idle symbols 605 is now presented.

The cell 601 consists of 3.000 symbols 222 and the clock tolerance is ±300 ppm. The tolerance value means, that the transmission of 1.000.000 symbols 222 may take 300 symbol periods 225 more or less than the nominal time period. In other words, a first computing apparatus 101 with the symbol rate at the high end of the tolerance band transmits 1.000.300 symbols 222 while in the same time a second computing apparatus 101 at the low end of the tolerance band transmits 999.700 symbols. This can be recalculated for a cell length 606 of 3.000 symbols 222. The first computing apparatus 101 transmits 3.001 symbols 222 while the second computing apparatus 101 transmits 2.999 symbols in the same time period. This means, that the second computing apparatus 101 receives a cell 601 from the first computing apparatus 101 within 2998 of its own symbol periods 225 and the first computing apparatus receives a cell 601 from the second computing apparatus 101 within 3002 of its own symbol periods 225.

The formula is developed in the followings:

T: the tolerance value's amount as a proportion, in this example T:=0.000300 n: the number of symbols 222 per cell 601 margin: a fraction of the symbol period 225 to ensure some slack trunc( ): the truncation function $P_{min}$, $P_{nom}$, $P_{max}$: the cell period's 603 minimal, nominal, and maximal duration $$P_{min}:=P_{nom}-n*T$$

$$P_{max}:=P_{nom}+n*T$$

$$\Rightarrow$$

$$P_{max}-P_{min}:=2*n*T$$

$IS1_{min}$, $IS1_{default}$, $IS1_{max}$: the minimum number, the default number 605, and the maximum number of idle symbols 210 calculated for the case if one computing apparatus 101 is declared as the timing reference (first way).

$$P_{max}+IS1_{default} \leq P_{min}+IS1_{max}$$

$$P_{min}+IS1_{default} \geq P_{max}+IS1_{min}$$

with $IS1_{min}:=0 \Rightarrow$ $$IS1_{max}-IS1_{default} \geq P_{max}-P_{min}$$

$$IS1_{default} \geq P_{max}-P_{min}$$

$$\Rightarrow$$

$$IS1_{default}:=\text{trunc}(P_{max}-P_{min}+1+\text{margin})$$

and since $P_{max}-P_{min}=2*n*T$ $$\Rightarrow$$

$$IS1_{default}:=\text{trunc}(2*n*T+1+\text{margin})$$

$$IS1_{max}:=2*IS1_{default}$$

$IS2_{min}$, $IS2_{default}$, $IS2_{max}$: the minimum number, the default number 605, and the maximum number of idle symbols 210 calculated for the case if all computing apparatuses 101 cooperate (second way).

$$P_{min}+D2_{max} \leq P_{max}+D2_{min}$$

$$IS2_{max}-IS2_{min} \leq P_{max}-P_{min}$$

with $IS2_{min}:=0 \Rightarrow$ $$IS2_{max} \leq P_{max}-P_{min}$$

$$\Rightarrow$$

$$IS2_{max}:=\text{trunc}(P_{max}-P_{min}+1+\text{margin})$$

and since $P_{max}-P_{min}=2*n*T \Rightarrow$ $$IS2_{max}:=\text{trunc}(2*n*T+1+\text{margin})$$

and $$IS2_{default}:=IS2_{max}/2$$

The results for the example:

$$IS1_{default}:=\text{trunc}(2*3000*0.000300+1+0.3)$$

$$IS1_{default}:=\text{trunc}(1.8+1.3)=3$$

$$IS1_{max}:=2*3=6$$

and $$IS2_{max}:=\text{trunc}(2*3000*0.000300+1+0.3)$$

$$IS2_{max}:=\text{trunc}(1.8+1.3)=3$$

$$IS2_{default}:=3/2=1.5$$

According to the above calculations, for the case if all computing apparatuses 101 cooperate in establishing and maintaining the cell locked state (second way) in the example the range for the number of idle symbols 210 is 0 to 3, and the default number of idle symbols 605 is $IS2_{default}:=1.5$.

The situation is different when the first way with a declared timing reference is followed for establishing and maintaining the cell locked state 310. Since it is unknown where the timing reference computing apparatus 101 is in the symbol rate tolerance band, the structure needs to be prepared for both worst cases. As calculated, the default number of idle symbols 605 has to be assigned as $IS1_{default}:=3$ and the allowed range is 0 to 6. As we can see this method is inferior if the reference symbol rate has a loose tolerance like in the example for this calculation. When only computing apparatuses 101 with high precision clocking are used as symbol rate reference there is no issue with this effect.

A tighter clock tolerance and a shorter cell 606 decrease the number required for the default number of idle symbols 605, e.g. with a clock tolerance of ±50 ppm (parts per million) and with a practical cell size 606 of 1.000 symbols 222 only occasional corrections are needed and the default number of idle symbols 605 could be specified as 1, with 0 as the minimum and 2 as the maximum number of the idle symbols 210.

The computing apparatuses 101 have no information about their own position in the symbol rate tolerance band. The computing apparatus 101 should measure the symbol transmission rate of each connected computing apparatus 101 in units of their own symbol period 225. If a participant observes a tolerance deviation for another computing apparatus 101, it is unclear which of the two is out of tolerance. If multiple computing apparatuses 101 are measured in this way and the assumption is made that nearly all of them are healthy, then the computing apparatus 101 with the clock rate out of tolerance can be easily identified. Beyond a certain threshold the symbol rate deviation cannot be compensated by adjustments of the number of the inserted idle symbols 210 within the specified range, so the cell locked state 310 of the network 410 cannot be achieved and maintained. In this case the deviating computing apparatus 101 has to be taken out of service. Further details like error recovery are not explained here.

When cell locking is established, all computing apparatuses 101 transmit their cell start symbols 209 nearly simultaneously. A straight forward consequence is that the cell start symbols 209 from different sources do not arrive to the respective target computing apparatuses 101 simultaneously if the link delays 224 are different. Cell locking in general and the scope of the embodiments is not constrained to the here described methods of acquiring and maintaining the cell locked state.

An embodiment of the cell locked network 410 has to assign the symbol positions in the cell 601 and the encoding for the cell start offset measurement 226 data.

Figure 3:
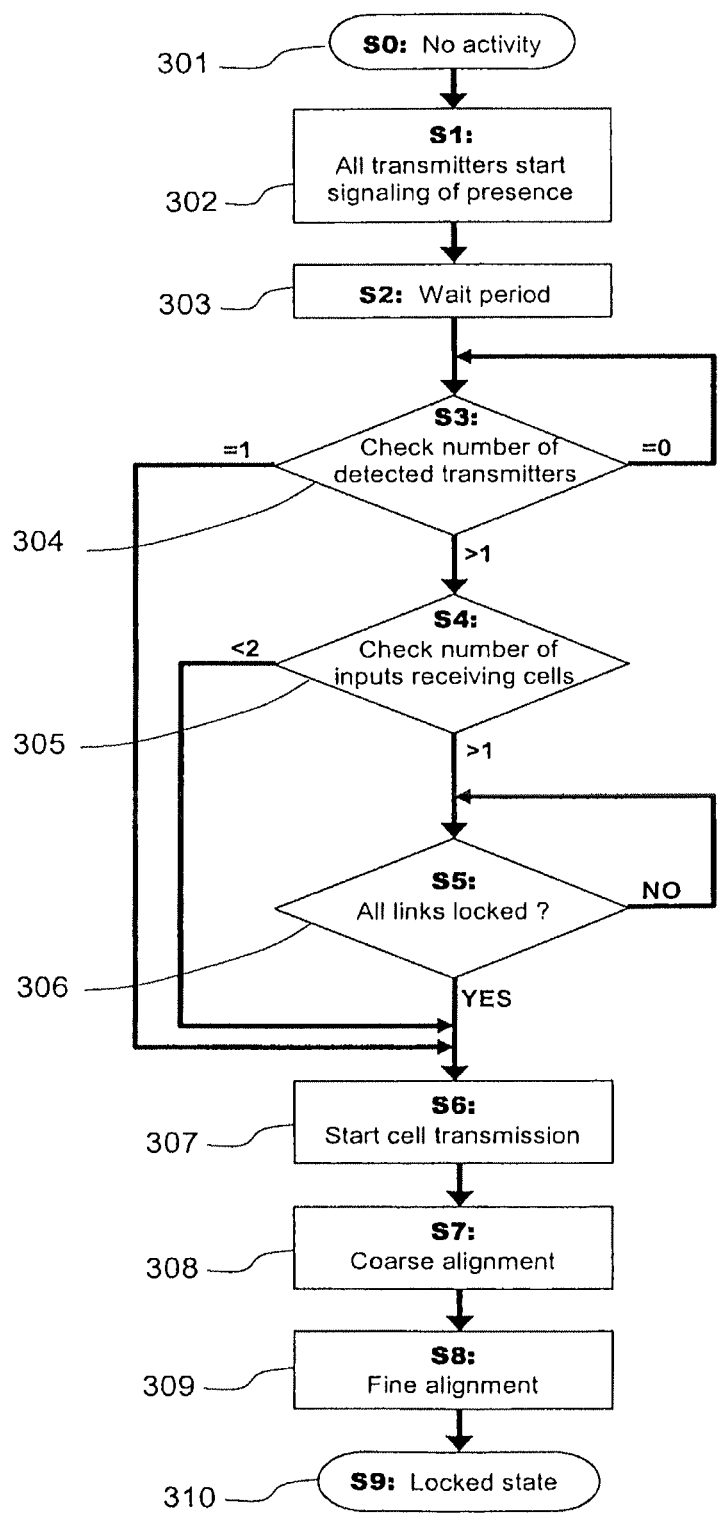
FIG. 3 shows a flow diagram of the initialization sequence of a computing apparatus.

FIG. 3 shows a simple flow diagram of an initialization sequence of a computing apparatus 101.

Step S0 301: When a computing apparatus 101 is powered up, its links 221 to the cell locked network 410 are logically and physically inactive.

Step S1 302: After some basic initializations are done, the computing apparatus 101 starts signaling of presence to all supported links 221, e.g. via periodical beaconing.

Step S2 303: A short wait period is necessary to allow that the computing apparatuses 101 which are already transmitting cells 601 to other computing apparatuses 101 start cell transmission to this computing apparatus 101.

Step S3 304: The computing apparatus 101 checks the number of the detected transmitters on its links 221. Transmitters are counted regardless whether they are transmitting cells 601 or are just signaling presence. Continuation depends whether none, 1, or more transmitters have been detected. If no transmitter was detected, then this state persists and the checking procedure is repeated indefinitely.

Step S4 305: If more than 1 transmitter was detected in step S3 304 then the number of the connected computing apparatuses 101 which are transmitting cells 601 has to be determined.

Step S5 306: If more than 1 connected computing apparatus 101 is identified as transmitting cells 601 in step S4 305 then it has to be checked whether the links 221 to those computing apparatuses 101 already achieved the locked state S9 310. If not, then step S5 306 persists until the links 221 to those other computing apparatuses 101 achieve the locked state S9 310.

Step S6 307: If in step S3 304 exactly one connected computing apparatus 101 was detected or in step S4 305 none or one computing apparatus 101 was detected as transmitting cells 601, or in step S5 306 it was detected that the links 221 to the cell 601 transmitting computing apparatuses 101 are all in the locked state S9 310, then this computing apparatus 101 shall start the transmission of cells 601. The cell start symbol 209 should be transmitted in alignment to the already operating transmitters, simultaneously on all links 221 which have detected that a computing apparatus 101 is connected. The initially transmitted cells 601 must be in the format which is required for the coarse alignment state S7 308.

Step S7 308: A coarse alignment procedure is followed until the cell starts 227 of all connected computing apparatuses 101 are aligned to a predefined relatively large time period.

Step S8 309: A fine alignment procedure leads to the locked state S9 310.

Step S9 310: Finally the link 221 has achieved the locked state.

A computing apparatus 101 which is starting up its links 221 to the network 410 starts presence signaling unconditionally via all implemented interface links 221 of the cell locked network 410. A wait period allows that the connected computing apparatuses 101 which are already transmitting cells 601 via other links 221 start transmission of cells 601 via the link 221 to the computing apparatus 101 which has just started signaling presence. After the wait period the computing apparatus 101 checks its links 221 for the number of the detected transmitters. If none is detected then the computing apparatus 101 stays in the state of waiting S3 304 for the activation of connected computing apparatuses 101. If more than one computing apparatus 101 is detected then it is checked how many of the connected computing apparatuses 101 is transmitting cells 601. If at least two computing apparatuses 101 are transmitting cells 601, then the computing apparatus 101 waits until all links which carry cell 601 transmissions achieve the locked state S9 310. Then, and also in the case if no or only one connected computing apparatus 101 is transmitting cells 601, and also in the case if only a single connected computing apparatus 101 is detected as present, the computing apparatus 101 has to start cell 601 transmission. The cell 601 transmission is started as much as possible aligned to the other computing apparatuses 101 which are transmitting cells 601. Thereafter the coarse alignment and the fine alignment process bring the links 221 of the computing apparatus 101 to the locked state S9 310.

Depending on the robustness of the alignment mechanism specified for an embodiment a more liberal state sequence could be allowed.

All computing apparatuses 101 are supposed to be preset to one and only one predefined embodiment of the cell locked network 410 architecture. It is certainly possible to add some level of configurability which is resolved to a specific configuration during the initialization sequence.

The cell 601 contents used on the links 221 which are in the coarse alignment state S7 308 are typically different from the contents used in the fully functional payload transmission mode which is associated with the locked state S9 310. However unnecessary divergence of the cell 601 contents in different modes of operation should be avoided.

The protocol used or the format assignments of a cell 601 during the coarse alignment state S7 308 of a link 221 are not specified. What can be specified is the format for the transmission of at least the following information:

The geographic address 106 of the computing apparatus 101, except if a link 221 mapping per geographic address 106 is predefined in an embodiment.

A link 221 state table per geographic address 106 of the connected computing apparatuses 101.

A link 221 full functionality table per geographic address 106 of the connected computing apparatuses 101.

In the fine alignment state 309 of a link 221 in addition to the above a cell start offset measurement information 226 is transmitted in each cell 601.

When a number of connected computing apparatuses 101 are started at the same time, these independent computing apparatuses 101 are going to have their cell start symbols 209 distributed in an unpredictable pattern related to the cell cycle 604. At this point cases may also be considered of a network which is not wired up in a complete full mesh topology 105. The unpredictable distribution pattern of the cell starts 227 may happen even if the process exactly follows the steps of FIG. 3.

The alignment can be achieved by applying a prioritization scheme which considers the connected computing apparatuses 101 in a priority order of their geographic addresses 106. E.g. consider the connected computing apparatus 101 with the lowest geographic address 106 as a reference for the alignment. Each computing apparatus 101 aligns its cell start 227 to the cell start 227 of the computing apparatus 101 with the lowest geographic address 106. This first alignment process will be called the coarse alignment.

The cell locked state 310 is originally specified as a link 221 state. Computing apparatuses 101 which have cell locked links 221 can be called to be cell locked since all links 221 in the cell locked state 221 are operated synchronous and locked to each other. The cell locked network 410 naming also reflects the more universal nature of the cell locked state.

When computing apparatuses 101 are added to a network 410 which has already achieved the cell locked state, the computing apparatuses 101 which have already cell locked state should not make any changes in support of the initial alignment of the added computing apparatuses 101. The earlier described prioritization scheme is only applicable for the coarse alignment until the deadlock possibility is eliminated. Computing apparatuses 101 added to an already operating cell locked network 410 have to align their cell start timing to the already established timing of the cell locked computing apparatuses 101. When the added computing apparatus 101 achieved the cell locked state it is to be handled like the other computing apparatuses 101 within the maintenance procedure of the cell locked state of the network 410.

For purposes of the coarse alignment the link delays 224 are ignored and only the locally measured offset 226 of the received cell start symbols 219 to the locally generated cell start symbol 209 is considered. When a certain level of alignment is achieved, it is necessary to change to the finer method. For the support of this finer method it is required that the computing apparatuses 101 transmit their measured offset data 226 at a defined symbol position in the cell 601.

While the cell locked state needs to be obtained for all links 221 within the cell locked network 410 to establish the basis for higher level usage, primarily it will be individual links 221 which arrive at the cell locked state.

It is important to avoid the phenomenon of independent subsets of cell locked links 221. In a full mesh network topology 105 this is avoided when the state sequence specified in FIG. 3 is followed.

In architectures which are based on multiple interlinked cell locked networks 410 it is possible that the addition of a computing apparatus 101 connects between two cell locked networks 410 which are not synchronous to each other. A priority structure could be used so that the cell transmissions of one cell locked network 410 uses an appropriate variation to the number of the applied idle symbols 210 until the two cell locked networks 410 establish a unified cell locked environment. The linkage of the two networks 410 cannot take place before the unified cell locked environment is established.

It needs to be considered that transmitting to all connected computing apparatuses 101 simultaneously is not a limitation but an enabler to the intended cell locking of the network 410.

For an embodiment the maximum offset 228 of any two connected computing apparatuses 101 can be determined and taken into account when the next higher level protocol is established.

When a computing apparatus 101 declares the cell locked state for a link 221, it transmits this state information to all connected computing apparatuses 101. When both computing apparatuses 101 which are connected by the link 221 declared the locked state the link 221 is available for payload transmissions. The full functionality of a link 221, which implies its locked state, should be confirmed on every cell period 603.

If an error happens to a link 221, then with the next cell start 227 the computing apparatus 101 which detected the error negates the full functionality for that link 221 and an initialization sequence for that link 221 is started. Certainly when other links 221 of the respective computing apparatuses 101 are in the cell locked state, applying the cell start symbols 209 simultaneously to the other cell start symbols 209 the link 221 will establish the cell locked state within just a few cell cycles 604. Even if a failure is experienced for only one path 215 of a link 221, the reverse path of the link 221 should also be considered unusable for the subsequent arbitration.

In a healthy system all links 221 should achieve the cell locked state in a very short time. When starting up the cell locked network 410, it may be useful to wait with the start of payload traffic until all established links 221 achieve the cell locked state and signal full functionality.

It will now be described how the cell locked state can be maintained.

When the cell locked state is established for a link 221, then that link 221 is able to carry payload data 701 in both directions.

While in the cell locked state, cells 601 are required to provide the cell start symbol offset measurement information 226 via a specified symbol position within the cell 601. As an example, an 8-bit signed integer should be sufficient in most implementations.

All computing apparatuses 101 which are in the cell locked state participate in the alignment maintenance procedure. This means that utilizing the cell start offset data 226 from own measurements and the cell start offset measurement data 226 received from the connected and cell locked 310 other computing apparatuses 101, during every cell period 601 a potential correction is prepared in each cell locked computing apparatus 101. The calculated number of idle symbols 210 can be applied immediately after the last symbol 220 of the currently transmitted cell 601. The number of the applied idle symbols 210 should be within the defined range for the number of the idle symbols 210. If no improvement can be achieved for the alignment, then the default number of idle symbols 605 should be applied. The midpoint between the least and greatest number of the applied idle symbols 210 of all connected computing apparatuses 101 should be kept in the (default−1) to the (default+1) value range.

The above concept is applicable if all computing apparatuses 101 have a direct link 221 to each other. If a direct link 221 is not provided, then the cell starts 227 can still be synchronized over a reference chain. However, the longer the reference chain the larger the total range of all cell starts 227 will be.

One specific case of the above is if a generic component computing apparatus 101 provides links 221 to a large cell locked network 410 on the one side and links 221 to a secondary cell locked network (S_CLN) 405 on the other side. See FIG. 4. The cell locked networks 410 and 405 operate agnostic of any higher level communication protocols. The interfaces to the higher level communication protocols can be implemented in separate protocol specific adapter computing apparatuses 101, which connect to the secondary cell locked network 405. Alternatively the computing apparatus 101 which connects to the secondary cell locked network 405 can be connected to a high performance local bus and contain an I/O device so that the I/O interface does not appear physically.

Figure 4:
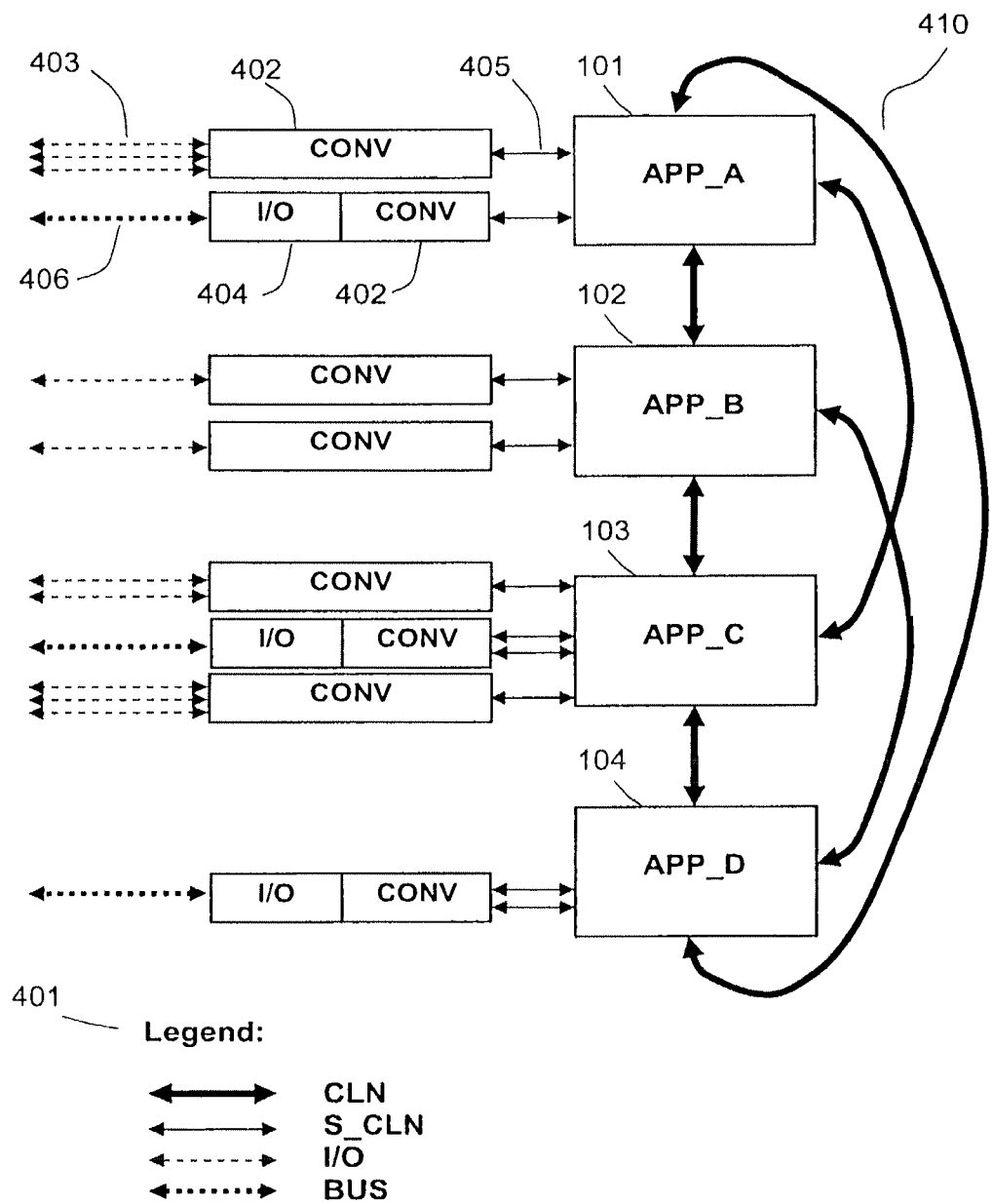
FIG. 4 shows a schematic block diagram indicating several variants of how interconnected computing apparatuses might use secondary cell locked networks.

FIG. 4 shows several variants of how the computing apparatuses APP_A 101, APP_B 102, APP_C 103, and APP_D 104 which are interconnected in a cell locked network 410 might use secondary cell locked networks 405. The secondary cell locked network 405 might connect to a converter component (CONV) 402 which connects to I/O interfaces e.g. Ethernet, SAS, etc. Another possibility is to connect to an integrated converter and I/O function comprising an I/O function part 404 which is connected to a local bus and a converter component 402 which converts the I/O protocol to an interface of the secondary cell locked network 405. The protocol converter component 402 can contain a very high bandwidth support of one of the standard protocols, and the corresponding data queues are forwarded directly into the secondary cell locked network 405.

Zero should be the smallest allowed number of the idle symbols 210. Since the number of the applied idle symbols 210 has to grant the alignment among the links 221 in the symbol rate tolerance range, some slack needs to be included. This also guarantees that at least one idle symbol 210 appears with some non-zero regularity. Therefore it is possible to disseminate some control information via the idle symbols. Idle symbols transmitted after the last symbol of a cell 220 need not be specific SKP symbols but any symbols 222 except the cell start symbol 209.

If high precision clocking is used and the number of symbols 222 per cell 601 is not very high it is possible to specify 0 as the lowest number of the idle symbols 210 and 1 as the highest number of the idle symbols 210. In this case the default value of idle symbols 605 is 0.5. This can be realized so that alternately 0 and 1 idle symbols 210 are applied. This method reduces the idle symbol 210 overhead to a minimum.

For whatever reason it may be required that one computing apparatus 101 is declared to be the timing reference for the cell locked network 410. A priority structure might be used to resolve the case if more than one computing apparatus 101 claims to be the timing reference. The timing reference computing apparatus 101 transmits always the default number of idle symbols 605. If a computing apparatus 101 claims to be timing reference but it is not part of the cell locked subset of the network 410 then the cell locked computing apparatuses 101 shall approach the timing reference without breaking the cell locked state.

It will now be described how an external clock is distributed via the cell locked network 410.

The following is a short description of the case where an external clock source is available which the cell locked network 410 provides amongst the connected computing apparatuses 101 instead of using separate clock distribution circuitry.

The computing apparatuses 101 which have connection to the specific external clock source use a phase locked loop (PLL) to synchronize the local clock to the external clock source. Computing apparatuses 101 with connection to the external clock source declare that they are of higher priority than other computing apparatuses 101 running under locally generated clocks. If more than one computing apparatus 101 with the external clock source is available, further prioritization is necessary in the implementation. The computing apparatus 101 which identifies itself to be of the highest priority always uses a constant number of idle symbols 605, the other computing apparatuses 101 adjust the number of the idle symbols 210 to achieve and maintain the cell locked state using the highest prioritized computing apparatus 101 as a reference.

The idea makes possible to distribute e.g. the 8 kHz telecommunication clock through the cell locked network 410 and avoid dedicated clock distribution interconnects. For this purpose the structure is arranged so that the cell cycle 604, which is the sum of the cell transmission period 603 and the time period for the constant number of idle symbols 607, is a divisor of the period of the external clock. The computing apparatus 101 which distributes the clock must be declared to be the timing reference and identify the cell 601 and the symbol 222 position which matches the next edge of the external clock. Alternatively the direct relation of the symbol period 225 to the external clock period can be utilized, avoiding constraints to the cell length 606.

It will now be described how an information block is disseminated across several cells 601.

Some constant or slowly changing information needs to be disseminated at the here discussed lowest level of a hardware protocol of the cell locked network 410. A symbol 222 at a predefined position in the cell 601 is allocated for the sequential transmission of an information block. The disseminated information might include the geographic address 106, globally unique identifier, product and vendor information, state codes of the links 221 to the connected computing apparatuses 101, etc.

A symbol position specified for this purpose can be used to transmit packets of information with subsequent symbols of the packet being transmitted at this symbol position in subsequent cells 601. A non-data symbol is needed to identify the start of the packet.

An implementation may specify whether the packet length is open or fixed. In both cases the assigned protocol, conventions, etc. need to be specified.

If low level information is transmitted in equal long packets i.e. information blocks, it is even better if these equal long packets are transmitted aligned to each other across the cell locked network 410. A simple way to achieve synchronicity for these equal long packets is via using a pre-start non-data symbol 222. When one of the computing apparatuses 101 transmits the pre-start symbol in a cell 601, in the subsequent cell 602 all computing apparatuses 101 transmit the packet start symbol and go on transmitting the packet. If a computing apparatus 101 observes that there was no packet start symbol for longer than the packet period would allow, the computing apparatus 101 is entitled to restart the packet communication via transmitting the pre-start symbol and then the packet start symbol.

The above described synchronous packet transmission enables an efficient InterIntegrated Circuit ($I^2C$) emulation embedded in the cell locked network 410. Each computing apparatus 101 transmits its $I^2C$ signal stream one byte per cell 601 via a specified symbol position within the synchronous packet. All computing apparatuses 101 receive the symbol of the $I^2C$ transmission of all other computing apparatuses 101. Exactly one of the codes is identified as valid, namely the one which would have got the priority if the same data would have been transmitted over an $I^2C$ network. So as to support a priority scheme bits are considered to be transmitted with most significant bit first. The computing apparatuses 101 which lost this type of arbitration transmit "1111 1111" data codes in the subsequent cells 602 until the computing apparatus 101 is entitled to transmit data to the $I^2C$ protocol emulation. It is the synchronous nature of the cell locked network 410 and of the synchronous packet over it which enable this embedding in such a simple manner. The clock stretching function of I²C can be added via the transmission of a specified non-data symbol. If this non-data symbol is received from one of the computing apparatuses 101 then I²C data transmitted in the same cell 601 by all other computing apparatuses 101 has to be ignored.

In the following, an option to operate links 221 at multiples of the basic symbol rate will be described.

In a basic version of the embodiment all links 221 connecting the computing apparatuses 101 are operated at a nominally identical symbol rate. The network cabling or the backplane routing tends to be the limiting factor for the applicable symbol rate in a large system. The links 221 between proximate computing apparatuses 101 could be operated at higher symbol rates. Therefore, the option is described to operate a subset of the links 221 at integer multiples of the basic symbol rate of the cell locked network 410.

Corresponding to the factor applied to the symbol rate multiple cells 601 can be transmitted in the time period of one cell 603 in the basic symbol rate. So as to maintain a high level of transparency, the multiple symbol rate is utilized so, that during each symbol period 225 of the basic symbol rate a corresponding higher number of symbols 222 can be transmitted, supporting one symbol position for each of the cells 601.

Figure 5:
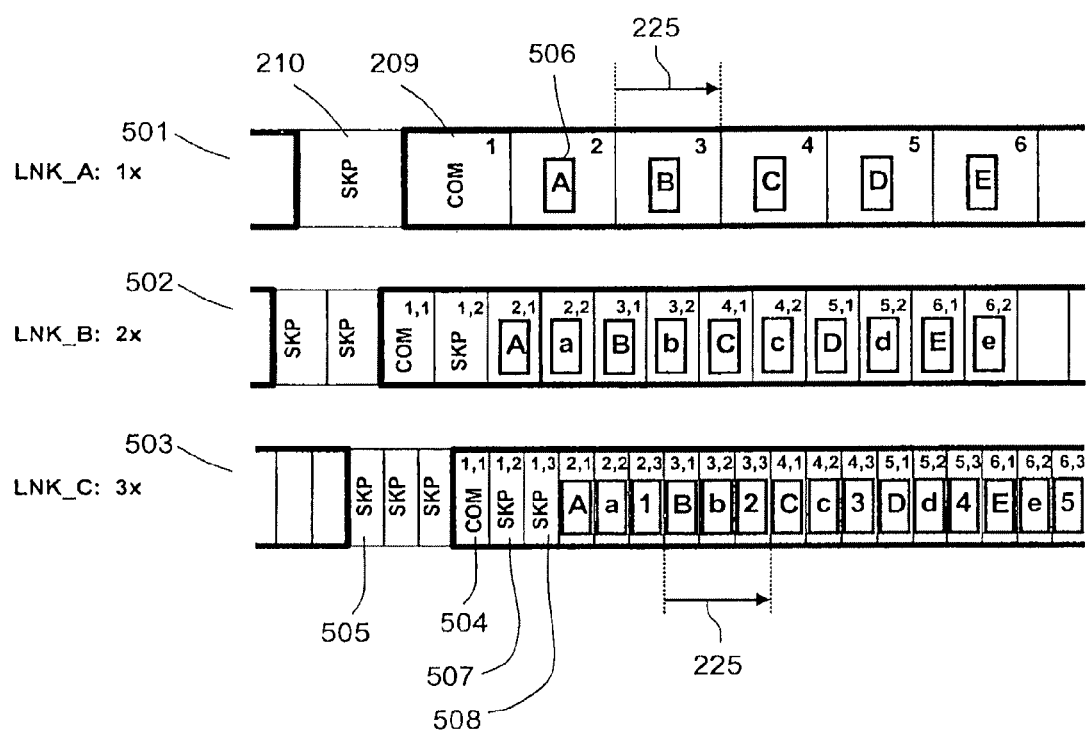
FIG. 5 shows an example for an interleaved transmission via multiple speed links.

FIG. 5 shows an example for an interleaved transmission via multiple speed links 221. The link LNK_A 501 shows a path 215 operated at the basic symbol rate, transmitting the symbol sequence "ABODE". The link LNK_B 502 shows a path 215 operating at the double symbol rate and it is shown transmitting the symbol sequences "ABODE" and "abcde" interleaved. The link LNK_C 503 shows a path 215 operating at the triple symbol rate and transmitting the symbol sequences "ABODE", "abcde", and "12345" interleaved. In the displayed symbol 222 sequence for LNK_C the cell start 227 is identified by a cell start symbol 209 of one third duration 504, here identified as the COM symbol which is followed by two ⅓ length filler symbols 507, 508, here using SKP. In this sequence 503 it is also shown that one idle symbol position of the basic symbol rate is filled in by three ⅓ duration filler symbols 505. In general, the cell 601 transmitted via the first of the multiple positions provides all control symbols, the additional cells transmit only data, the control symbol positions are unassigned.

The cell locked network 410 is mainly characterized by the feature that all cells 601 are transmitted nearly simultaneously, with other words, there is a guaranteed limit in the offset of the cells 228 transmitted across the cell locked network 410. A well configured embodiment grants a cell offset 228 of just a few symbol periods 225. The embodiments apply for any cell locked network 410 and are not limited to the case when cell locking is established according to the embodiment described above.

In the following embodiments all computing apparatuses 101 are interconnected by a full mesh network 105 and they are identified via a geographic address 106.

The following embodiments are based on the concepts that network participants which, beyond transmitting data and receiving data for their own needs, also serve as forwarding agents for other participants' data, so producing a service for the utilization of their links when they do not need them. A central control for the data transmissions is not required. Additionally, a flow control at the basic protocol level is not required. Transmission routing must not be based on longer term information. Error checking and re-transmission are not required. Starvation of individual network participants should be avoided. Priority levels may optionally be supported. High availability support allows to continue service if one link breaks. Addition and removal of participants is supported in a live network. The routing control can be agnostic of higher level protocols. The network operation and routing control can be completely autonomous and invisible for all layers of software. The control overhead should not exceed acceptable limits.

In the embodiments, it is assumed that the data to be transmitted is available via egress queues 1404 and arriving data is saved into ingress queues 1405. Both queue types exist independently for each of the implemented links 221.

The high bandwidth potential provided by a full mesh network 105 can be utilized by the computing apparatuses 101 if all of them interchange data directly all the time. Most real networks are used in a different way. Typically, some computing apparatuses 101 need high bandwidth to some other computing apparatuses 101 for a shorter or longer time period, while other computing apparatuses 101 have a low bandwidth or occasional data exchange.

Some embodiments provide high bandwidth data transport capability between computing apparatuses 101 at the time when they need it by transparent dynamic utilization of otherwise idle signaling paths 215. This can be achieved via the addition of a forwarding agent function to the computing apparatuses 101.

A computing apparatus 101 which acts as a forwarding agent for transmissions between other computing apparatuses 101 is able to temporarily store data for the assisted transmissions. Since the maximum size of the network 410 as well as the cell length 606 are specified for an embodiment, this requirement is not a limiting factor.

To resolve the above described concept items, a solution is proposed that for each arbitration round each computing apparatus 101 disseminates its transmission requests as well as its receiver capabilities to all connected computing apparatuses 101 identically. This makes it possible to execute the arbitration in each computing apparatus 101 identically and a need to distribute arbitration results can be avoided.

The transmission requests and receiver capabilities are disseminated using symbol positions which are associated per geographic address 106 of the respective computing apparatuses 101.

The following alternative solutions for payload forwarding could be provided.

According to a first forwarding solution, the complete data segment of a cell 601 is used as an atomic unit of the payload data. This solution spreads over a dynamically changing number of two or three cell cycles 604. In a first pipeline stage the transmission requests and receiver capabilities are disseminated, in a second pipeline stage transmissions via direct connection paths 215 are executed together with transmissions to forwarding agent computing apparatuses 101. In a third pipeline stage the forwarding agent computing apparatuses 101 transmit the stored data to the target computing apparatuses 101. This solution uses the maximum of the cell content for the data transmission. By using a second cell period 603 for forwarding of the transmissions via the forwarding agent computing apparatuses 101, an additional delay for the payload data is incurred. A consequence of the pipelining is that the link 221 reservation information needs to be communicated to potentially new participants of the cell locked network 410. Otherwise they cannot join the cell locked network 410 or recover from a failure situation. A direct connection path 215 may not be immediately available for a fresh request for a transmission in the direct communication of the connected computing apparatuses 101 when the path 215 is already assigned for the delivery of forwarded data. This solution requires temporary storage for a complete cell 601 capacity of payload data in the forwarding agent computing apparatus 601, for each supported link 221.

According to a second forwarding solution, a cell 601 is subdivided into equal length multiple payload data sectors which can be individually routed and forwarded through the cell locked network 410. The data sectors are forwarded during the same cell period 603 as subsequent data sectors via a forwarding agent. The last data sector is not usable to transmit data to a forwarding agent. The second forwarding solution avoids arbitration through a sequence of cells. Compared to the above first forwarding solution, a finer granularity of the resource allocation and lower storage requirements in the forwarding agent computing apparatuses 101 can be achieved, while the overhead for the requirement and capability transmission is higher and the arbitration procedure could be more complex. Furthermore, the arbitration granularity and the response time are not shorter than the cell cycle 604.

According to a third forwarding solution, payload forwarding is provided within the same cell period 603. Two cell formats are used, CF1 702 with the payload data range 704 starting early, and CF2 703 with the payload data range 704 starting delayed. The third forwarding solution can be simple to implement and also very effective. The payload data segment 704 is a few symbols 222 less than what can be transmitted with the other two forwarding solutions. The cell 601 positions which cannot be utilized for data transmission are not really wasted. They can be assigned to carry a secondary communication structure e.g. an IP network. An advantage is that in the forwarding agent computing apparatus 101 temporary data buffering is needed only for a few symbols 222. The size of the data buffers is thus independent of the cell length 606. The third forwarding solution uses a short pipeline. The transmission requests and receiver capabilities are disseminated in one cell period 603, the arbitration takes place before this cell period 603 ends, and all resulting data transmissions take place during the subsequent cell period 608.

It is common to all three forwarding solutions that request and capability information are sent at predefined symbol positions during the cell 601 transmission. The symbol positions can be assigned so that enough time remains for the execution of the arbitration algorithm even in most complex scenarios. No matter which symbol positions are assigned for the control information, the data transmission is interleaved with control communication. The request and capability information received from all connected computing apparatuses 101 comprises the parameters for the arbitration algorithm deciding about the utilization of resources for the data transmission during the subsequent cell period 608.

In the following, an embodiment is described in more detail based on the third forwarding solution.

It should be noted that there may be numerous other forwarding strategies. However higher efficiency of the forwarding mechanism will be coupled with more complex arbitration and is probably burdened by a higher overhead for the transmission of request and capability information.

Figure 7:
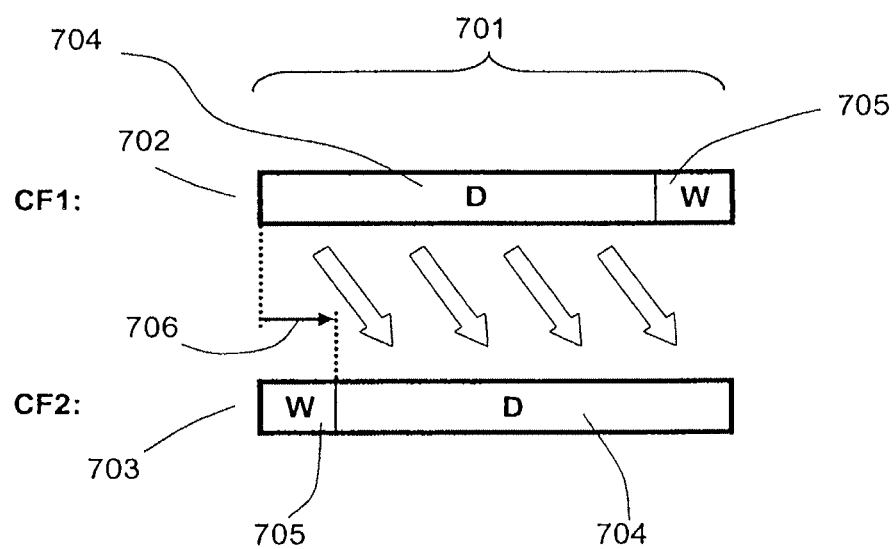
FIG. 7 shows an example of two cell formats in an embodiment.

FIG. 7 shows a simple picture of the two cell formats CF1 702 and CF2 703. The cell payload 701 is split into a data segment (D) 704 and a wasted segment (W) 705 which is another segment wasted in terms of this protocol layer. The wasted segment W 705 is significantly smaller than the data segment 704. Cell format CF1 702 contains a DW sequence while cell format CF2 703 contains a WD sequence. The data segment D 704 carries one atom of data in the cell locked network 410. When the transmitters use cell format CF1 702, and the length of the wasted segment W 705 is selected appropriately, a forwarding agent computing apparatus 101 can retransmit the data segment D 704 of a cell 601 received in the cell format CF1 702 within the same cell period 603 using cell format CF2 703.

The required forwarding shift 706 can be calculated from the maximum possible offset of the cell starts 228 amongst the locked subset of computing apparatuses 101, the defined maximum value of the link delay 224, the cell length 606, and the symbol rate tolerance. A fixed handling overhead can be added for the forwarding agent computing apparatus 101 which needs to fetch the data, make it available for its local symbol clock, multiplex with other symbol streams and then transmit the data. The above considerations for the calculation include that the forwarding shift has to work not only at the beginning of a cell 601 but during the complete cell period 603. With a 5 Gb/s signal rate which corresponds to a symbol 222 rate of 500 Mega-symbols per second if the 8-bit to 10-bit encoding scheme is used, with maximum 50 ppm clock tolerance the required forwarding shift 706 is around 25 to 30 symbol periods 225. A real implementation has to define and verify the required forwarding shift 706 via simulation. If the symbols 222 in the wasted segment 705 cannot be assigned for any other use, a cell based network with 1000 symbols per cell 606 incurs a bandwidth loss of around 3% due to this payload forwarding method.

Since the wasted segment W 705 persistently exists in all cells 601, its assignment to a useful purpose in an implementation is desired. E.g. the wasted segment W 705 could be assigned as a steadily existing data channel for direct communication of the computing apparatuses 101 which the link 221 connects. This allows a low bandwidth communication without burdening the high bandwidth cell locked network 410.

The third payload forwarding solution works as a two stage pipeline in subsequent cell 601 transmissions. In the first pipeline stage the control symbols 805 containing request and capability information are disseminated, while in the second pipeline stage the data segment 704 is transmitted.

It is not necessary to differentiate the two cell formats CF1 702 and CF2 703 within the transmitted cell 601 because the cell format association can be recovered from the arbitration results. No symbol position needs to be wasted to identify the boundary between the data segment D 704 and the wasted segment W 705 since their lengths are predefined in an embodiment.

Symbol position assignments within the cell 601 for control symbols 805 comprising symbols 222 required for cell synchronization and locking as well as symbols 222 which carry arbitration relevant information should remain fixed irrespective of the here used cell format differentiation, otherwise unnecessary complexity is added.

Figure 8:
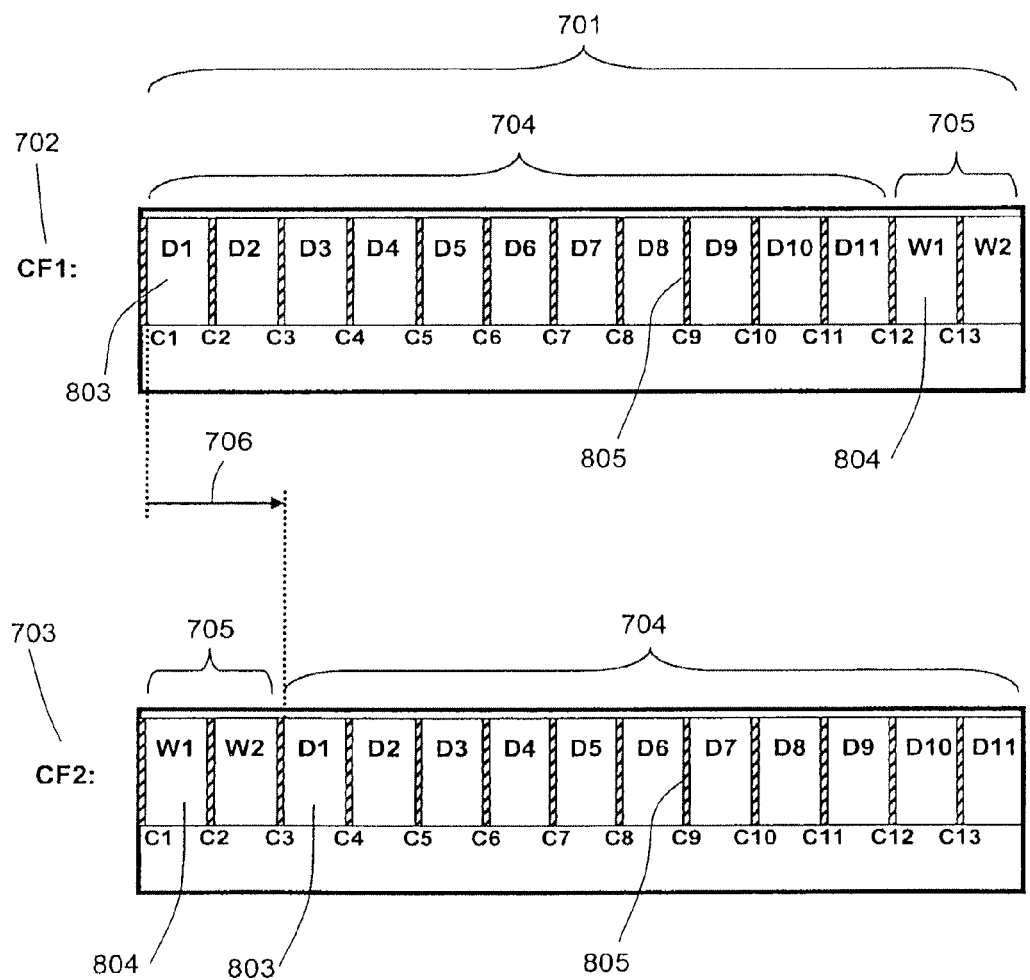
FIG. 8 shows an example for additional cell structuring.

FIG. 8 shows an example for additional structuring of the cell 601 to keep the complexity of implementations in limits. In this example, control symbols 805 identified as C1 through C13 are distributed in the cell 601 at uniform grid positions and the remaining positions are available for payload data 701, classified as sub-segments D1-D11 704 and W1-W2 705. Implementations can be significantly simplified if the control symbols 805 are not placed at arbitrary positions but in a regular pattern. The lengths of the W sub-segments 705 and the D sub-segments 704 are specified to match said regular pattern. This structure provides a constant shift for each data symbol position 803 when the forwarding agent computing apparatus 101 receives the D1 to D11 data sub-segments 803 in cell format CF1 702 and retransmits these in cell format CF2 703. If control symbols 805 need to be forwarded, they can also be assigned to follow the same shift. If a cell 601 is very long it is possible that too many control symbol positions result. In this case most of the unnecessary control symbol positions can be reassigned to data symbols. However this reassignment is different for CF1 702 and CF2 703 respectively. An example for this assignment is included in the table of FIG. 16 for an embodiment.

Figure 9:
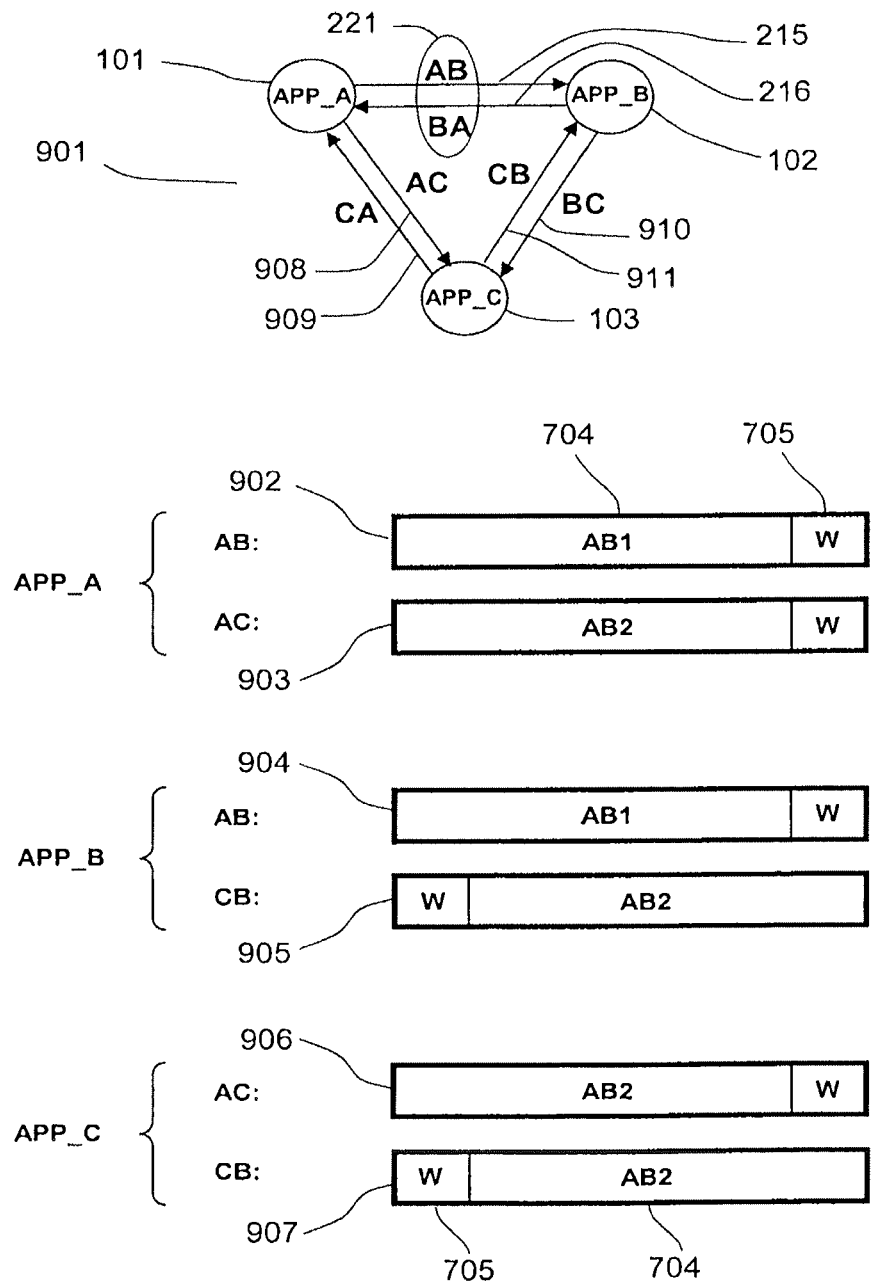
FIG. 9 shows a simple example for a payload forwarding procedure.

FIG. 9 shows a simple example for the third payload forwarding solution. In the overview drawing of the example system 901 computing apparatuses APP_A 101, APP_B 102, and APP_C 103 are shown with their full mesh bidirectional interconnect links 221. The data transmission paths comprising the link 221 between computing apparatuses APP_A 101 and APP_B 102 are identified as AB and BA with path AB 215 for the data transmission in APP_A 101 to APP_B 102 direction and path BA 216 for data transmission in the APP_B 102 to APP_A 101 direction. The paths between APP_A 101 and APP_C 103 are correspondingly named AC 908 and CA 909 and the paths between APP_B 102 and APP_C 103 are named BC 910 and CB 911. For this simple example computing apparatus APP_A 101 has two cells 601 amount of payload data 704 to transmit to computing apparatus APP_B 102, these segments of payload data 704 we identify as AB1 and AB2. FIG. 9 shows how these two segments of payload data 704 are transmitted within a single cell period 603. AB1 is transmitted via the direct path AB 215 using cell format CF1 702, shown for APP_A 101 as the transmitter 902 and for APP_B 102 as the receiver 904. AB2 cannot be transmitted via the direct path AB 215 since that path is already assigned for the transmission of AB1. Since paths AC 908 and CB 910 are unassigned, they can be assigned for payload forwarding. Computing apparatus APP_A 101 transmits the AB2 content via the AC path 908 to computing apparatus APP_C 103 in cell format CF1 702, shown for APP_A 101 as the transmitter 903 and for APP_C 103 as the receiving forwarding agent 906 computing apparatus 101. Computing apparatus APP_C 103 as a forwarding agent retransmits the AB2 content via the CB path 911 in cell format CF2 703, shown for APP_C 103 as the transmitting forwarding agent 907 and for APP_B 102 as the receiver 905. Computing apparatus APP_B 102 saves the received payload data 704 from both paths AB 215 and CB 911 into its ingress queue for data received from computing apparatus APP_A 101.

Figure 10:
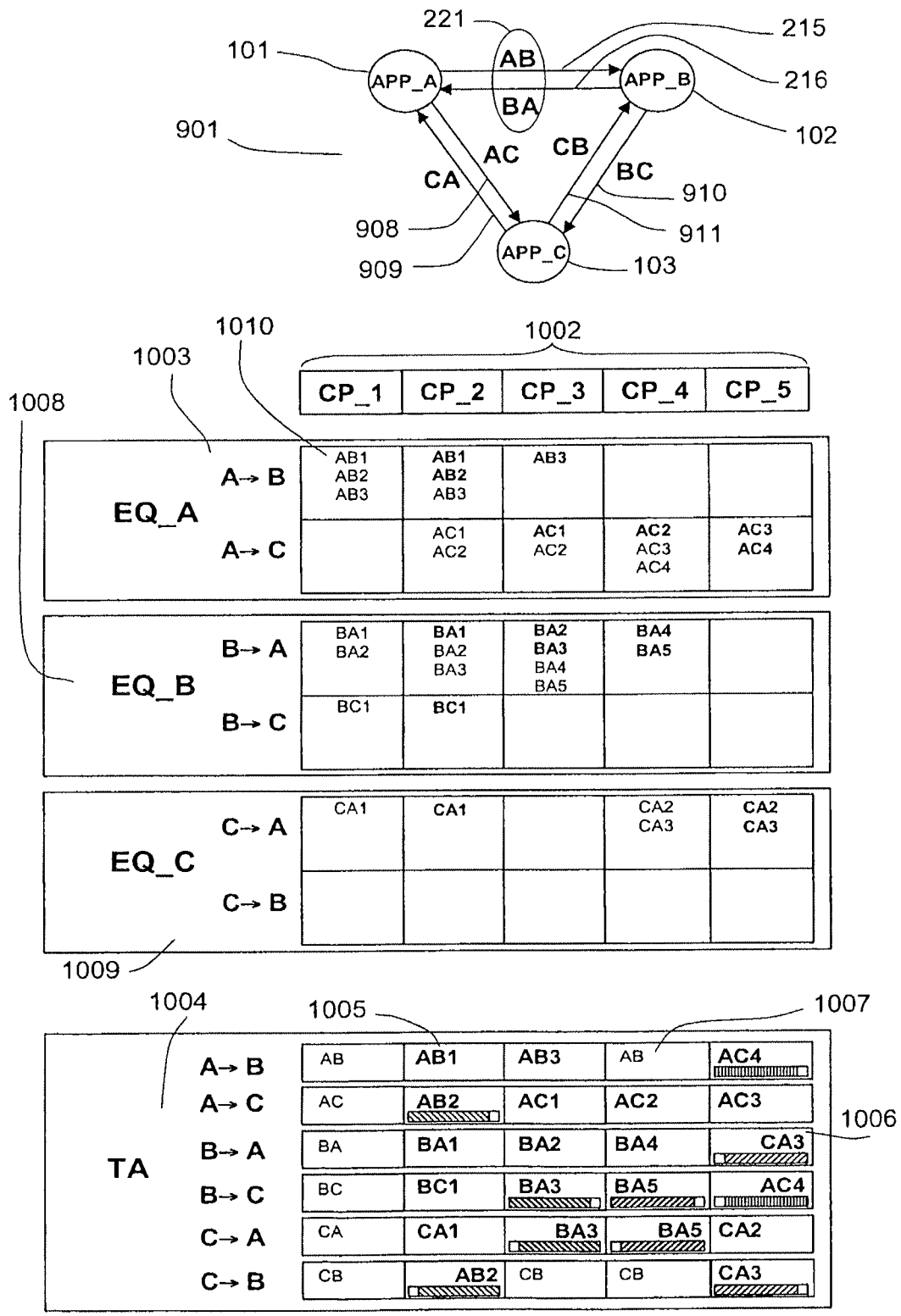
FIG. 10 shows an example of a cell locked network operation especially with regard to a payload forwarding mechanism.

FIG. 10 shows an elaborate example of the cell locked network operation especially with regard to the payload forwarding mechanism. Three computing apparatuses APP_A 101, APP_B 102, and APP_C 103 are shown with links 221 comprising a full mesh interconnection 901. The example shows a sequence for five cell periods 603 CP_1, CP_2, CP_3, CP_4, and CP_5 1002. The egress queue contents 1010 are shown for each of the cell periods 1002 for APP_A 101 as EQ_A 1003, for APP_B 102 as EQ_B 1008, and for APP_C 103 as EQ_C 1009. Each computing apparatus 101 has two egress queues, one for each link 221. The identification of the egress queue contents follows the conventions of FIG. 9. Egress queue contents which are transmitted in the respective cell period 603 are distinguished by bold typeface. The transmission assignments table TA 1004 in FIG. 10 shows the assignment of the egress queue contents 1010 to the data transmission paths for each cell period CP_1 through CP_5 1002. A left aligned table content 1005 refers to a transmission in cell format CF1 702 while a right aligned table content 1006 refers to a transmission in cell format CF2 703. Some data transmission paths are unused 1007, in this example these are assigned to be available for direct transmission and identified via a smaller typeface.

The transmission sequence shown in FIG. 10 is now described for each cell period 603.

In the first cell period CP_1 the content items 1010 AB1, AB2, AB3, BA1, BA2, BC1, and CA1 are available in the respective egress queues at the time when the conditions are frozen for the execution of the arbitration.

In the second cell period CP_2, AB1, BA1, BC1, and CA1 are transmitted via the respective direct connection paths AB 215, BA 216, BC 910, and CA 909. AB2 is transmitted via APP_C 103 as a forwarding agent and this means that the transmission uses the path AC 908 for a CF1 702 transmission and path CB 911 for a CF2 703 transmission. The also pending transmission requests AB3 and BA2 cannot be satisfied in the second cell period CP_2. These and the additional items AC1, AC2, and BA3, the lightface identified subset of the egress queue contents 1010, are used by the arbiter to determine the assignments for the next cell period 603.

In the third cell period CP_3, the items AB3, AC1, and BA2 are transmitted via the respective direct connection paths AB 215, AC 908, BA 216. BA3 is transmitted via the forwarding agent computing apparatus APP_C 103, using the paths BC 910 and CA 909 in cell formats CF1 702 and CF2 703, respectively. The transmission request for AC2 cannot be executed in the third cell period CP_3. AC2 and the additional items BA4 and BA5 are the data transmission request input items for the next arbitration.

In the fourth cell period CP_4, the items AC2 and BA4 are transmitted via the respective direct data paths AC 908 and BA 216. BA5 is transmitted via APP_C 103 as the forwarding agent using the paths BC 910 and CA 909 for transmission in the CF1 702 and CF2 703 formats, respectively. The pending request for AC3 cannot be satisfied in the fourth cell period CP_4. AC4, CA2, and CA3 are additional items.

In the fifth cell period CP_5 items AC3 and CA2 are transmitted via the respective direct connection paths AC 908 and CA 909. AC4 is transmitted via the path AB 215 to APP_B 102 which serves as forwarding agent and forwards AC4 via the path BC 910 to APP_C 103. CA3 is transmitted in cell format CF1 702 via the path CB 911 to APP_B 102 which serves as a forwarding agent and retransmits CA3 in cell format CF2 703 via the path BA 216 to APP_A 101.

In the following, the arbitration algorithm is described in more detail.

Subjects for the arbitration are data available in protocol agnostic egress queues (PAEQ) 1404 for each supported link 221 individually, in portions of the data segment 704 of a cell payload 701. If data is available in the PAEQ 1404, requests are generated towards the arbitration according to the number of the cells 601 needed. The task of the arbiter 1401 is to assign data paths 215 to deliver these data segments 704 to the destination via the direct connection path 215 or via the assignment of forwarding agent computing apparatuses 101 and data paths 215 to and from the forwarding agents to deliver additional data. Assumption is that many of the data paths 215 in the full mesh cell locked network 410 are not always required for data transmission between respective directly connected computing apparatuses 101 and therefore numerous data paths 215 are available for payload forwarding.

The embodiments are not limited to a specific arbitration algorithm for the allocation of the data transmission paths 215 according to the transmit requests and receiver availability and capability. The content or format of the disseminated information set is not constrained to anything specific either.

The proposed arbitration mechanism or procedure is based on the situation that the complete data transmission requirement and the receiver capability information is disseminated by each computing apparatus 101 to each other computing apparatus 101, and when the computing apparatuses 101 execute the arbitration procedure locally, they all come simultaneously and independently to the same result for the allocation of the data transmission resources. This happens without central control or coordination. After the arbitration, the data is routed through the cell locked network 410 controlled by the locally available arbitration results.

The transmission path assignments resulting from the arbitration are valid for the duration of one cell period 603, irrespective of whether the transmission path assignments are resulting to satisfy transmission requests or produced by any other behavior of the arbitration algorithm. Consequently, it may happen that a transmission path 215 is readily available when data appears in an egress queue PAEQ 1404.

The receiver capabilities information needs some clarification. Receiver capability information in the sense of the available buffer for a specific number of cell data segment contents is not useful in this context. The receiver is supposed to have storage for a significant number of cell data segment contents 704 and the receiver is supposed to be able to feed received cell data segment contents 704 into individual ingress queues 1306 of different higher level protocols. The receiver building block should be able to accept a cell data segment 704 of any amount which the cell locked network 410 delivers. If the data flow needs to be stopped or throttled, this can be communicated via the flow control mechanism of the higher protocol layers. This is completely in line with the concept of considering the cell locked network 410 to behave as a conduit, and a conduit certainly does not provide flow control. Should other means fail the receiver substructure can provide an educated way to free up receiver buffers by dropping data destined to those ingress queues which do not fetch the received data. It is certainly possible to nevertheless add buffer availability information to the arbitration relevant information and use it accordingly. A list of geographic addresses 106 for which a computing apparatus 101 has its receiver available is provided. This list may be identical to a list of fully functional links 221.

In a case where a data transmission path 215 provides a bandwidth of more than one symbol 222 per symbol period 225, the arbitration and also the data set disseminated in support of the arbitration have to be enhanced accordingly.

There are two approaches to provide the higher bandwidth:
  Implementation of multiple symbol rates
  Implementation of links with several parallel lanes.
  These two approaches can be combined, too.

All control information can be communicated via one defined cell per link, e.g. the one which is transmitted via the first of the multiple interleaved transmissions on the first of several parallel lanes. The control symbol positions in the other transmission sequences are not assigned per this invention.

Computing apparatuses 101 can be grouped to clusters 1102 with high bandwidth interconnects for the cluster internal subsets 1103 of the links 221 in the full mesh network.

Figure 11:
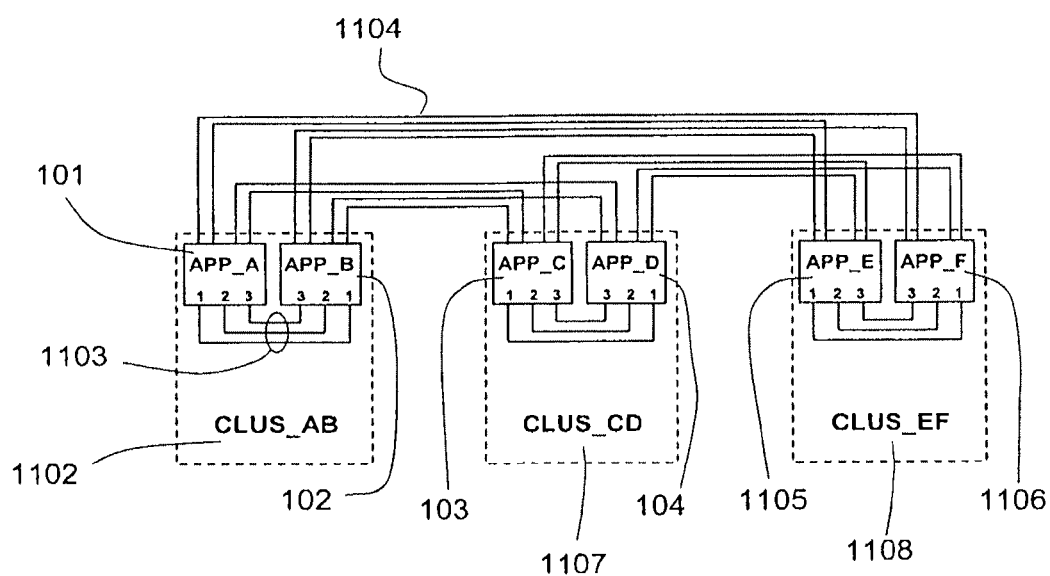
FIG. 11 shows an example for a clustered network structure of six computing apparatuses.

FIG. 11 shows an example for a clustered network structure of six computing apparatuses APP_A 101, APP_B 102, APP_C 103, APP_D 104, APP_E 1105, and APP_F 1106. The computing apparatuses APP_A 101 and APP_B 102 form cluster CLUS_AB 1102, APP_C 103 and APP_D 104 form cluster CLUS_CD 1107, APP_E 1105 and APP_F 1106 form cluster CLUS_EF 1108. The components of a cluster 1102 are shown as connected by a link 221 implemented as 3 parallel lanes 1103. The links 221 which connect computing apparatuses 101 of different clusters 1102 are shown with single lane link 221 connections 1104.

This clustered architecture can be implemented without a high cost or real estate penalty due to the proximity of the computing apparatuses 101 which form the clusters 1102. The proximity should allow a double or triple symbol rate configuration and also the implementation of additional lanes. The bandwidth for the cluster 1102 internal connections 1103 should be maximized.

So as to get maximum benefit from the clustered architecture the arbitration could be enhanced by applying the following path assignment steps sequentially, each step assigning resources exhaustively.
  Direct connection paths are assigned for direct transmission.
  Cluster internal transmissions are assigned to cluster internal forwarding agent computing apparatuses.
  Forwarding agent computing apparatuses for cluster-to-cluster transmissions are assigned within the source computing apparatus's cluster.
  Forwarding agent computing apparatuses for cluster-to-cluster transmissions are assigned within the target computing apparatus's cluster.
  Forwarding agent computing apparatuses for cluster-to-cluster transmissions are assigned in other clusters.
  Forwarding agent computing apparatuses for cluster internal transmission are assigned across the complete network.

The arbitration should assign the pending data transmission requests to the transmission paths 215 so that the full mesh topology is optimally used, but at the same time it should be ensured that connections are not blocked. Both concepts are served by assigning the first transmission of the PAEQ 1404 to each target computing apparatus 101 via the respective direct connection path 215. Additional data transmission can be performed via forwarding agent computing apparatuses 101 utilizing connection paths 215 which remained unused after the direct transmission path 215 assignments have been done. For the sake of equal chances, a variant of a round robin distribution can be used. It needs to be considered that the time for the arbitration is constrained to the number of symbol periods 225 available between the reception of the last arbitration relevant information and the start of the first symbol 222 for the payload data 701 in the subsequent cell period 603.

The availability information is disseminated to all computing apparatuses 101 identically to allow that the arbitration produces identical results in each computing apparatus 101. Links 221 have to be handled symmetrically, if one path 215 is declared to be unavailable, the path 216 for the reverse direction of the link 221 can be handled also as unavailable.

Independent of the arbitration algorithm, a convention can be established, which rules the order in which the transmitted data is sent through the cell locked network 410 when using the routing assignments produced by the arbitration. This is needed because several routes are available at the same time for the same purpose. The convention regulates the sequence how the transmitter assigns the data segments so that the receiver is able to reassemble the data stream in the correct order. An example for the convention is described below.

In the following, a symbol input stream handling within the network interface (NWIF) building block of a computing apparatus 101 is described.

As already stated, each computing apparatus 101 has an independent local clock which is the source of the locally generated symbol rate, used for transmitting symbols 222 and possibly used also by other structures of the computing apparatus 101.

Each input symbol stream arrives at the computing apparatus 101 with the symbol rate of the transmitting computing apparatus 101. Each input symbol rate can be slightly lower or slightly higher than the computing apparatus's 101 own symbol rate. This situation can be resolved in the symbol receiver architecture.

The hardware structure at the very front of the symbol input works at the input symbol rate, for each link 221 individually and independently. A PLL is used to recover a clock from the input signals. The symbol input clock can be recovered e.g. with an appropriate divider.

With a slightly different internal symbol rate it is impossible to directly pass the input symbols 223 into the local structure which uses the local symbol rate, since either double readings of input symbols 223 or omissions of input symbols 223 could occur.

Figure 12:
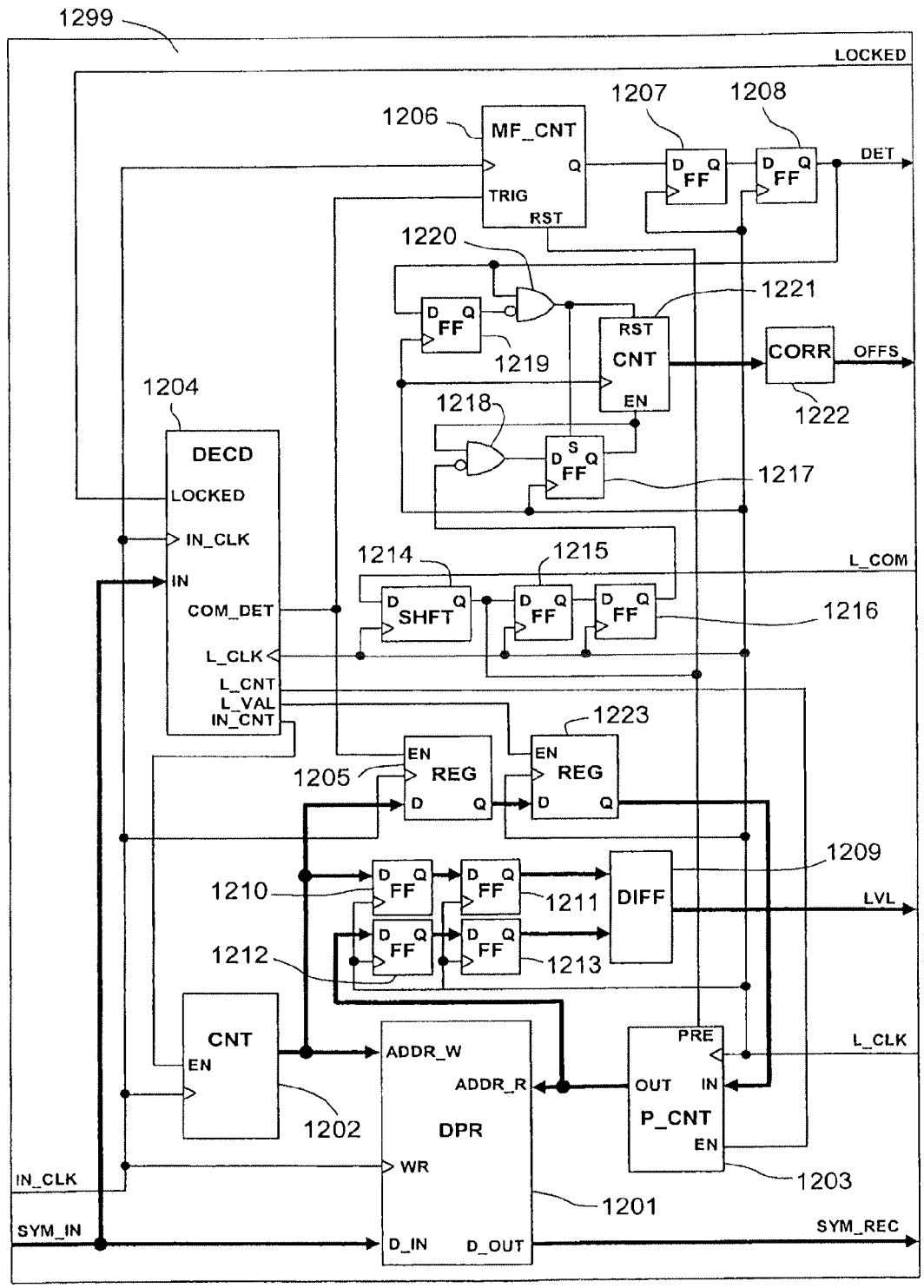
FIG. 12 shows a schematic circuit diagram of a concept for a special asynchronous first-in-first-out memory.

FIG. 12 shows a schematic circuit diagram of a special asynchronous first-in-first-out memory (FIFO) 1299 for the support of the symbol input stream. This schematic is not intended to be described completely. Only those parts relevant for the understanding of the embodiments are described here.

During the fine alignment process 309 and during the cell locked state 310 maintenance the functionality is as follows: Input symbols 223 are written to the asynchronous FIFO 1299 at the input symbol rate using an input clock (IN_CLK) and symbols are read out at the local symbol rate using a local clock (L_CLK). A write address (ADDR_W) is generated by a counter (CNT) 1202 which advances to a subsequent write address at each IN_CLK clocking. A read address (ADDR_R) is generated by a presettable counter (P_CNT) 1203 which advances to the subsequent read address at each L_CLK clocking. Both CNT 1202 and P_CNT 1203 are enabled continuously during this mode of operation. When generating subsequent addresses the CNT 1202 and P_CNT 1203 counters generate identical cyclic address sequences, which are of reflected binary encoding, also called Gray code. Upon every IN_CLK clocking the input symbol 223 available via the symbol input (SYM_IN) is stored to the dual ported storage array (DPR) 1201 at the ADDR_W address. The symbol 223 available at SYM_IN is checked in the decoder building block (DECD) 1204 whether it is the received cell start symbol 219, and if yes then comma detection (COM_DET) is asserted. The asserted COM_DET signal from DECD 1204 enables a register (REG) 1205 to store the current ADDR_W which is the address where the cell start symbol 219 is stored in the DPR 1201. A few L_CLK periods later the stored ADDR_W value is forwarded to the REG 1223. The assertion of COM_DET signal from the DECD 1204 is also used to trigger a monoflop counter (MF_CNT) 1206. The output of the MF_CNT 1206 is synchronized to the L_CLK by flip-flops (FF) 1207 and 1208 producing the detection output signal (DET) which signals that a received cell start symbol 219 is detected. The signal DET is cleared shortly after the MF_CNT 1206 is reset or when the monoflop counter terminates. It is possible to determine the number of currently stored symbols 223 in the FIFO 1299 using the comparator structure consisting of an FF pair 1210 and 1211 which synchronize the ADDR_W value, another FF pair 1212 and 1213 which delays the ADDR_R value, and a combinatorial logic (DIFF) 1209 which produces a binary number LVL synchronous to the L_CLK. LVL reflects the number of the currently used storage positions in the FIFO 1299. L_COM is an input signal to the FIFO 1299. L_COM carries a pulse in the L_CLK cycle when the cell start symbol COM is transmitted. The shift register (SHFT) 1214 delays this pulse to the L_CLK period in which the forwarded cell contents 704 are to be started in the format CF2 703. This shifted pulse is the right signal to enable the preset of the P_CNT 1203 to load the stored address of the received cell start symbol 219 from the REG 1223. The next group of building blocks produces the value for the measured offset (OFFS) 226 between the transmitted cell start symbol 209 and the received cell start symbol 219. The CNT 1221 counts the symbol periods 225 for the offset measurement. It should be able to count up to the complete length 606 of the cell 601. The CNT 1221 has synchronous inputs for reset and enable. The FF 1219 and the gate 1220 produce a pulse upon the assertion of the DET signal. This pulse additionally sets the settable FF 1217, which together with the gate 1218 hold the enable input (EN) of the CNT 1221 asserted. The output signal of the SHFT 1214 is further delayed via the FF 1215 and the FF 1216, and when the shifted pulse arrives at the output of the FF 1216 the pulse negates the enable input of the CNT 1221. From here on, the output of the CNT 1221 is stable until the next received cell start symbol 219 is detected. The stable output of the CNT 1221 is in a fix relation to the cell start offset 226. The result for the OFFS 226 is calculated in a corrector (CORR) 1222 to provide the OFFS binary code which corresponds to the measured offset 226 between the input cell start symbol 219 and the output cell start symbol 209. The correction in the CORR 1222 subtracts a constant depending on the implementation which ensures a zero result of OFFS 226 for the case if the cell start symbol output of the computing apparatus 101 would be received as a cell start symbol input. It needs to be considered that the value of the OFFS output is only valid when the CNT 1221 is not enabled.

The extent of the required buffering in the DPR 1201 depends on the symbol rate tolerance, the cell length 606, and the maximum link delay 224. The FIFO 1299 should be able to store excess symbols 223 during a cell period 603 if the input symbol rate is faster than the local symbol rate. The FIFO 1299 must be able to store enough symbols 223 of the input symbol stream to guarantee a continuous symbol stream at the L_CLK for a complete cell period 603. The buffering capacity of the asynchronous FIFO 1299 needs to cover in addition to the fluctuations caused by the clocking tolerance also the delay range of the shortest to the longest supported interconnects of the cell locked network 410. This special asynchronous FIFO 1299 is needed for each cell locked network 410 link 221 input individually and independently.

The input symbols 223 are written into the FIFO 1299 in the sequence as they are received. The local architecture reads each of the asynchronous input FIFOs 1299 so that the cell 601 reading is started with the received cell start symbol 219 for each input symbol stream simultaneously. Therefore in each asynchronous FIFO 1299 the local side has to set the ADDR_R to the stored address of the received cell start symbol 209. The right time to start the read of the cells 601 is critical. During the readout of the received symbols 223 which belong to a cell 601 the asynchronous FIFO 1299 is read out sequentially to SYM_REC clocked by the local clock L_CLK.

The asynchronous FIFOs 1299 of the cell locked network 410 are all read starting with the simultaneous read of the cell start symbol 209 from each of the asynchronous FIFOs 1299. So as to support the payload forwarding mechanism, the synchronous read of the cell start symbols 209 may not only happen simultaneously but also at a predefined number of L_CLK periods after the transmission of the cell start symbols 209 by the current computing apparatus 101 to the cell locked network 410.

Due to the transmission delays the last received symbols 223 of a cell 601 are fetched by the input structure after the output structure already started the transmission of the subsequent cell 602, therefore the routing control for the received symbols 223 should be maintained until the last received symbol 223 of the cell 601 has been correctly delivered.

In a specific implementation example, the asynchronous FIFO 1299 and its storage DPR 1201 may be built so that it can store not only 8-bit bytes for data but also non-data symbols 223.

The above described mechanism covers the case where the link 221 is in the locked state.

The concept drawing shown in FIG. 12 includes additions supporting the fine alignment state and the coarse alignment state of FIG. 3 in addition to the locked state. The DECD 1204 building block contains a structure which identifies the symbol positions in the cell 601 which are dedicated for control symbols 805 and are positioned in a regular pattern. An input signal LOCKED controls whether the cell locked state or the fine or coarse alignment states are valid for this interface. If the cell locked state is signaled via the asserted LOCKED control input then the enable signals IN_CNT and L_CNT are always or nearly always active. If LOCKED is cleared, the IN_CNT output enables the CNT 1202 only for the IN_CLK periods for the control symbol positions. The DECD 1204 generates the corresponding control for the local side L_CNT which lets the P_CNT 1203 advance also only at the control symbol positions. Certainly, the DECD 1204 can take care about the activation and deactivation of IN_CNT and L_CNT control corresponding responding to the LOCKED input so that the mode switching happens at the cell boundary. This added structure allows feeding the control symbols 805 into the main structure even if the cell locked state is not established. The size of the DPR 1201 and its addressing structure should support this case by providing more storage than the number of the control symbols 805 in the cell 601. The coarse alignment includes the possibility of double reading or omission resulting from the non-matched clocking. However this must be limited to happen to complete cells 601 and not to symbols 223 within a received cell 601. The DPR 1201 may sometimes contain two cell start symbols 209, while REG 1205 and REG 1223 store the address for both, REG 1223 providing the one which is to be used for the preload of the P_CNT 1203.

The cell locked network 410 is based on a cooperative behavior of the connected computing apparatuses 101. It is also assumed that the components of the implementation work properly. The case of failures is possible in real world installations. In large scale installations which are devoted to provide uninterrupted service through a long period of time it is important to sustain operation despite of the failure of a single system component. With some additional overhead it is possible to enhance the cell locked network 410 to tolerate a single point failure scenario.

The failure considered here is the case when a computing apparatus 101 stops receiving symbols 223 via one connection path 215. The experienced failure can be of transient or permanent nature. A transient failure can be caused by the loss of synchronization on a high speed serial interconnect. Reasons for a permanent failure can be:
  Connection broken
  Transmitter hardware failure
  Receiver hardware failure So as to limit the damage to the data flow, the failing path 215 should be excluded from the available resources as soon as possible. Therefore the unavailability information should be disseminated to all computing apparatuses 101 in the current or in the next cell period 603.

The arbitration structure is based on the dissemination of relevant information of each computing apparatus 101 to each other computing apparatus 101. The data segments routed through the non-operable path 215 are certainly lost and the cell locked network 410 does not have a repair structure for this case. Higher level protocols can detect the lost data and initiate a resend if required. However if arbitration relevant information is not communicated correctly from all computing apparatuses 101 to all other computing apparatuses 101 then the arbitration results will be different and the data streams cannot be routed correctly. Therefore all arbitration relevant information should be made available on an alternate path 215. This redundant structure is provided via resending the arbitration relevant information received from the cyclic predecessor computing apparatus 101 to all other computing apparatuses 101. When the redistributed arbitration relevant information is used, the damage can be limited to the loss of the data segment which was routed through the failing path 215.

An implementation for high availability should also consider the possible damage of forwarded data in a forwarding agent computing apparatus 101 or failures in the arbiter or other parts of the network interface structure. A more robust support for redundancy is possible via the implementation of an independent second parallel cell locked network 410.

The embodiment may include a redundant distribution of arbitration parameters to cover single connection failure scenarios.

A side effect of the conduit-like behavior is that, whether requested or not, the conduit unconditionally executes what resulted from the arbitration of the transmission requests. The implemented arbiters should follow rules to generate identical results also for cases where a data transmission window is not required or cannot be allocated to any requested data transmission. When a non-requested transmission path 215 and data are available for a route, it is allowed to use that route. The case of such usage should be recognizable for the receiver, though. Lowest level transmission requests might be used to acquire possibly required transmission routes, if priority levels are supported.

The embodiments are not limited to a specific way of implementing or not implementing transmission request priority levels. Furthermore, they are not limited to a specific way of encoding a higher level protocol on top of the cell locked network 410. A rule for symbol 222 assignments could be that the cell start symbol 209 must not be used for any other purpose than for signaling the cell start 227.

An often required feature of large network based systems is that network components can be inserted and removed without stopping or interrupting the system operation. From the viewpoint of the cell locked network 410 it is safe to negate data transmission capability in the information block of a cell 601 and switch off the cell locked network interface links 221 in the subsequent cell period 603.

The maximum number of network participants is important for a useful implementation. As it is clearly visible, the protocol overhead is coupled to the network size. This means, that a smaller network does not decrease the overhead, except if a different protocol is defined. It is also evident, that a smaller network has less bandwidth advantage potential than a larger network. On the other hand, larger networks grow into a challenge for the routing of the links, and the physical extent of the construction increases the signaling delays. The more components the network has, the more complex the arbitration machinery is. With these considerations the optimal size of the cell locked network might be in the range of 12 to 16 computing apparatuses. The embodiments are however not constrained to a specific size of the network.

In rack mounted systems some slots may be left unused for a specific application. In these cases mostly filler panels are used to close the shelf for air movement and EMC (electromagnetic compatibility) considerations. In systems which utilize a cell locked network architecture according to some embodiments it is useful and therefore recommended to fill otherwise empty slots not only with filler panels but with computing apparatuses which provide the payload forwarding capability in service of the cell locked network. This ensures that the bandwidth of the system is as high as possible.

If the locally generated symbol rates are specified to a tight tolerance and the cells 601 are not very long, an embodiment is possible where a cell start symbol 209 is followed by a predefined number of cell contents, without idle symbols 210 and without cell start symbols 209. This variant is quite advantageous because it saves a few symbol periods and maintains the flexibility for the individual handling of the cells 601.

Already mentioned is the possibility to increase the bandwidth of specific links 221 via using multiple lanes. It needs to be noted that when multiple lanes are used for a link 221 it may be necessary to use the cell start symbol 209 on each of the lanes. The length of all lanes within a link 221 should be nominally identical.

It is also possible to implement a cell locked network 410 using multiple lanes in all links 221 in both directions. In such implementations it is certainly possible to distribute the control symbols 805 across the specified number of the lanes. This either decreases the proportion of the control overhead of the protocol or allows a more flexible control protocol without increasing the proportion of the control overhead. With the above third payload forwarding solution using links 221 with multiple lanes the cell length 606 is increased, which can be quite detrimental if the really transmitted data amounts are rather small. Here, the above first payload forwarding solution might be a better fit and allows a moderate cell length 606 as well as shorten the response time of the network 410.

The above described infrastructure may be enhanced to enable transmission of symbol streams which represent different protocol formats.

Figure 13:
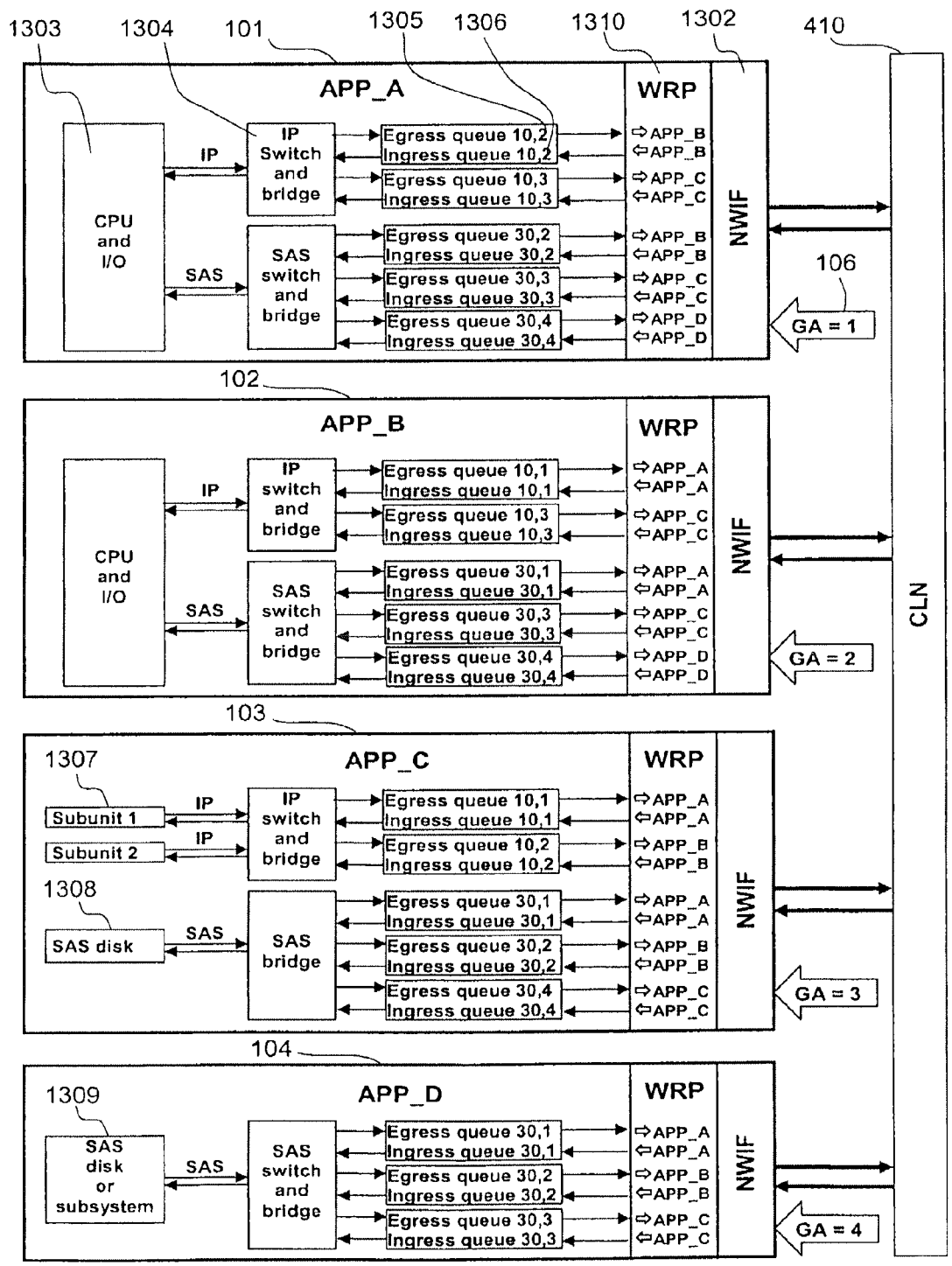
FIG. 13 shows an example of a cell locked network with support for multiple protocols.

FIG. 13 shows a schematic block diagram of an example of a cell locked network which supports multiple protocols.

The network interface (NWIF) 1302 building blocks of the computing apparatuses 101 contain structures like FIFOs 1299, multiplexers, an arbiter 1401, protocol agnostic ingress queues (PAIQ) 1405, and protocol agnostic egress queues (PAEQ) 1404.

A wrapper (WRP) 1310 building block contains the interface for the protocol specific egress queues 1305 and protocol specific ingress queues 1306 to the network interface NWIF 1302 building block.

The computing apparatus's local structure supports egress queues 1305 and ingress queues 1306 which are by nature protocol specific. The egress queues 1305 and ingress queues 1306 can be qualified by two numbers each. The first number identifies the protocol which is served by the queue while the second number identifies the geographic address 106 of the respective target or source computing apparatus 101.

Computing apparatus APP_A 101 and computing apparatus APP_B 102 both carry a CPU and input/output (I/O) 1303 configuration. Local Internet Protocol (IP) and SAS communication channels are connected to switching and bridging components 1304 which interface to egress queues 1305 and ingress queues 1306. Computing apparatus APP_C 103 shows a configuration with two IP interfaced subunits 1307 and a SAS interfaced disk 1308. Computing apparatus APP_D 104 shows a SAS disk or subsystem 1309. Computing apparatuses APP_A 101, APP_B 102, and APP_C 103 have both IP and SAS packets to transmit and receive via the cell locked network 410.

The NWIF 1302 maintains a single PAEQ 1404 and a single PAIQ 1405 for each supported link 221. The WRP 1310 has the functions to merge the symbol streams of protocol specific egress queues 1305 into a single PAEQ 1404 as well as separate the received symbol streams from the PAIQ 1403 to the protocol specific ingress queues 1306.

An implementation could specify a non-data symbol to fill up symbol positions within the cell 601 which happen to be unused.

Since the number of different protocols within the cell locked network 410 is not expected to be a very high number, the 256 values of a byte should suffice in most implementations. The protocol type may be declared in the first payload symbol position of each cell 601. In the example shown in FIG. 13 the IP protocol is identified with a code "10" while the SAS protocol is identified with a code "30".

If a protocol change is allowed within a cell, then a non-data symbol SWI needs to be assigned and used, so that the symbol 222 which follows the SWI symbol declares the new protocol type. It can be observed that the specified SWI symbol must not be used within any of the protocol data streams. It is especially important to consider that some packet protocols might not tolerate the interruption of the data stream within a packet, therefore the building block which feeds such an interface should start transmitting a packet only if it has the entire data set for the packet or if there is good reason to assume that the continuation of the data arrives in time, and in the occasional failure case a resend could be arranged. Interface building blocks should be built considering the priority aspects of time critical continuity requirements of certain protocols. It should be noted here, that every cell transmission period may grant at least the bandwidth of the direct connection between any two connected computing apparatuses 101. This can be sufficient basis for the streaming of data for time critical protocols through the cell locked network 410.

All egress and ingress queues in general should have a conduit-like behavior. Even if in the worst case data might be lost, it is important that unused data does not accumulate in the queues and block valuable resources. Incomplete data must be removed or transmitted from an egress queue else it blocks resources. Similarly incomplete received data must be removed from the ingress queues by whichever means.

FIG. 15 shows a table with a hierarchical view of relevant items in computing and networking systems and it should help in understanding how the cell locked network 410 is related to existing network architectures.

In the following, an embodiment with exemplary parameter values is described in more detail.

A PICMG 3.0 ® AdvancedTCA® shelf with a full mesh "Fabric Interface" implementation represents a possible infrastructure for a prototyping embodiment. "Port 0" is used for each "Link" in the full mesh network of the "Fabric Interface". Computing apparatuses 101 of a prototyping embodiment can be implemented as "mesh enabled" AdvancedTCA® "Boards".

The embodiment implements the symbol input architecture as shown in FIG. 12 and therefore the control information of the other computing apparatuses 101 is available already during the coarse alignment.

The following assignments are set for this example. The embodiment comprises up to 16 interconnected computing apparatuses 101. The backplane interconnect is a full mesh network. The electrical interface is LVDS (low voltage differential signaling). One differential pair per symbol flow direction is used in this example. The signaling uses balanced 8-bit/10-bit encoding. Both directions of the full duplex links have a nominally identical delay. The transmission bit rate is 3.125 Gbit/s. The transmission clock tolerance is ±50 ppm. The third payload forwarding solution is followed. The grid for the control symbols 805 is 25 symbol periods 225. The offset 706 for payload forwarding is 25 symbol periods 225.

The following non-data symbol definitions are used:
COM: The COMMA symbol used as the cell start symbol, assigned K.28.5.
SKP: the SKIP symbol used as the idle symbols, assigned is K.28.0. Any other symbol 222 except COMMA may be also used in the idle symbol 210 positions.
RST: the PAD symbol K.23.7 is assigned to reset the packet counter when transmitted at the C2 control symbol position specified for a packet transmission.
SWI: the SKIP symbol in payload data positions is used for protocol switching, assigned K.28.0.
PST: the SKIP symbol is used in the C2 control symbol position to signal pre-start, meaning that the subsequent cell contains an RST symbol and signalize the start of the next packet.
PAD: Repeated PAD symbols in payload data positions are used for filling up unused symbol positions, assigned is K.23.7.
Data symbols: the 10-bit encodings for 8-bit byte data.
Other non-data symbols may be used by the higher level protocols in the payload data positions of the cell.

In the following, an exact formula to calculate the number of the idle symbols is derived.

The following notations are used for the formula:
min( ): the minimum function applied to a set of values
max( ): the maximum function applied to a set of values
abs( ): the absolute value function: abs(x):=|x|
sgn( ): the signum function resulting −1, 0, or +1
trunc( ): the truncation function
mod: the modulo operator
$\emptyset$: the symbol for the empty set
$\epsilon$: the symbol for element of a set
$\notin$: the symbol for not element of a set
$\cup$: the union operator for sets
$\exists$: there is at least one
$\wedge$: the logical AND operator
$\vee$: the logical OR operator Specifying the following constants for the embodiment, explanations follow:
N:=16
n:=1025
defidle:=½
rangein:=4
entrlock:=1024
rangeout:=6
N: The number of computing apparatuses 101 supported by the implementation.
n: The number of symbols per cell 606.
minidle: The minimum number of idle symbols 210 minidle:=0 maxidle: The maximum number of idle symbols 210 maxidle:=2*defidle defidle: The default number of idle symbols 605 used in the embodiment. Calculated as defidle:=(minidle+maxidle)/2 or determined dynamically according to disseminated symbol rate tolerance values and considering whether a computing apparatus 101 is declared as a reference for the synchronization.

ga: a geographic address 106, $1 \leq ga \leq N$.
gax: a geographic address 106, $1 \leq gax \leq N$.
$APP_{ga}$: the computing apparatus 101 with the geographic address 106 ga.
$L_{ga,gax}$: the link 221 which connects $APP_{ga}$ and $APP_{gax}$
GA: index for the geographic address 106 of the current computing apparatus 101, the one for which this calculation is described: $APP_{GA}$.
SUB9: Subset of the geographic addresses 106 representing the computing apparatuses 101 which have links 221 in the locked state S9 310.

SUB9:={ga: ga$\epsilon$\{1 . . . N\},$\exists$gax$\epsilon$\{1 . . . N\} with $L_{ga,gax}$ in state S9}

SUB8: Subset of the geographic addresses 106 representing the computing apparatuses 101 which do not have links 221 in the locked state but have links 221 in the fine alignment state S8 309.

SUB8:={ga: ga$\epsilon$\{1 . . . N\},ga$\notin$SUB9,$\exists$gax$\epsilon$\{1 . . . N\} with $L_{ga,gax}$ in state S8}

SUB7: Subset of the geographic addresses 106 representing the computing apparatuses 101 which have links 221 only in the coarse alignment state S7 308.

SUB7:={ga: ga$\epsilon$\{1 . . . N\}, ga$\notin$SUB9,ga$\notin$SUB8, $\exists$gax$\epsilon$\{1 . . . N\} with $L_{ga,gax}$ in state S7} gacpr: The geographic address 106 of the cyclic predecessor computing apparatus 101 gacpr:=min(\{max(\{ga: ga$\epsilon$SUB9, ga<GA\}), max(SUB9)\})

$APP_{gacpr}$: The cyclic predecessor computing apparatus 101.
$moffset_{ga}$: The locally measured offset 226 of the cell start symbol 209 of $APP_{ga}$.
$moffset_{GA}$: The value is 0 for $APP_{GA}$.

roffset$_{ga}$: The received offset measurement data for the cell start symbol 209 from APP$_{ga}$. The value 0 is used if no measurement data is available, this should only occur during the coarse alignment.

roffset$_{GA}$: The value is 0 for APP$_{GA}$.

diffoffset$_{ga}$: This signed value equals the double of the offset 228 from the cell start 227 of APP$_{GA}$ to the cell start 227 of APP$_{ga}$.

diffoffset$_{ga}$:=moffset$_{ga}$−roffset$_{ga}$ moffsetrange: The range of the measured offset values 226.

moffsetrange:=max({moffset$_{ga}$: ga∈SUB7})−min({moffset$_{ga}$: ga∈SUB7})

rangein: The maximum value for abs(diffoffset$_{ga}$)) specified for the embodiment to qualify the link 221 L$_{GA,ga}$ to enter into the cell locked state.

entrlock: This is the predefined number of cell cycles 604 to wait when a link 221 L$_{GA,ga}$ is aligned to satisfy abs(diffoffset$_{ga}$)) rangein before the locked state is declared for that link 221.

rangeout: This is the threshold value for losing the cell locked status. When abs(diffoffset$_{ga}$))≥rangeout the implementation specifies to disqualify the link 221 L$_{GA,ga}$ from the cell locked state.

garef: This is the geographic address 106 of a computing apparatus 101 which disseminates that it is the timing reference for the network 410. Should there be more than one such computing apparatus 101 then they shall be all ignored.

APP$_{garef}$: The computing apparatus 101 which is the declared timing reference for the network 410.

garefvalid: If a timing reference is specified then garefvalid=TRUE else garefvalid=FALSE. The value of garef is ignored if garefvalid=FALSE. If a timing reference is introduced while locked state persists in the network 410 special precautions are needed to wander the cell locked subset of computing apparatuses 101

{APP$_{ga}$: ga∈SUB9} towards the timing of APP$_{garef}$ without breaking the cell locked state. APP$_{garef}$ has to be added to the locked subset immediately when abs(diffoffset$_{garef}$)≤rangein. No other additions to the locked subset are allowed during this procedure.

trefvalid: This value reflects whether a timing reference is valid, either specified or automatically selected. During the coarse alignment process if there is no finer aligned subset and the cell starts 227 are distributed to at least a quarter of the cell period 603 then the computing apparatus 101 with the least geographic address 106 is used as a timing reference.

trefvalid:=garefvalid ∨ ((SUB9=∅) ∧ (SUB8=∅) ∧ (moffsetrange≥n/4))

tref: This is the index for the timing reference either inherited from garef or automatically assigned for the initial coarse alignment.

if (garefvalid=TRUE)

then tref:=garef else tref:=min({SUB7})

ALIG7: The subset of SUB7 which is considered for the coarse alignment if there is no better aligned subset.

if (SUB9=∅) ∧ (SUB8=∅) ∧ (trefvalid=TRUE)

then ALIG7:={tref} else if (SUB9=∅) ∧ (SUB8=∅) ∧ (trefvalid=FALSE)

then ALIG7:=SUB7 else ALIG7:=∅

ALIG8: The subset of SUB8 which is considered for the alignment.

if SUB9=∅ then ALIG8:=SUB8 else ALIG8:=∅

ALIG: The subset to be considered for the alignment.

ALIG:=SUB9∪ALIG8∪ALIG7 first: This is the double value of the signed offset 228 of the earliest cell start symbol 209 to the current computing apparatus's 101 cell start symbol 209.

first:=min({diffoffset$_{ga}$: ga∈ALIG})

last: This is the double value of the signed offset 228 of the latest cell start symbol 209 to the current computing apparatus's 101 cell start symbol 209.

last:=max({diffoffset$_{ga}$: ga∈ALIG})

ISF$_{ga}$: The number of idle symbols which APP$_{ga}$ applied in front of the current cell maxis: the maximum value of the number of idle symbols applied in front of the current cell maxis:=max({ISF$_{ga}$,ga∈{ALIG}})

minis: the minimum value of the number of idle symbols applied in front of the current cell maxis:=min({ISF$_{ga}$,ga∈{ALIG}})

midis: the midpoint of the number of idle symbols applied in front of the current cell 601 midis:=(maxis+minis)/2 midis2: the double of midis to always carry an integer value midis2:=maxis+minis gravis: this value needs to be added in the calculation to guarantee that the number of the applied idle symbols 210 gravitates toward the default number of idle symbols 605. This value is identically calculated in each of the computing apparatuses 101 since a computing apparatus 101 applies the same number of idle symbols 210 toward each of the connected computing apparatuses 101.

gravis:=defidle−midis gravis2: the double of gravis to always carry an integer value gravis2:=maxidle−midis2 trg: The primary target for the next cell start.

trg:=(first+last)/2 trg2: The double of trg to always carry an integer value.

trg2:=first+last chg: This is the absolute value of the change to be applied relative to defidle if no timing reference needs to be approached to. If the timing reference is within SUB8 or SUB9 then this formula applies, too.

chg:=min({abs(trg+gravis/2),defidle})

chg2: The double of chg to always carry an integer value.

chg2:=min({abs(trg2+gravis),maxidle})

chgappr: This is the absolute value of the change to be applied relative to defidle if a timing reference needs to be approached to which is outside of the aligned subsets. If the cell start 227 timing of $APP_{garef}$ is outside the range of the aligned subset, then it has to be approached by the computing apparatuses 101 which are in the locked state S9 310 or in the fine alignment state S8 309, but the level of alignment must be maintained. Independent of the relative positions, the approach is always done in the same direction. This avoids that computing apparatuses 101 would take corrective moves in opposite directions while they are bound to the aligned subset. It is to be considered that the required value for the default number of idle symbols might need to be increased to allow synchronization under the modified conditions.

chgappr:=min(abs(trg),max(defidle,1))

nxtidle: The to be calculated number of idle symbols 210 applied by $APP_{GA}$ to all links 221 after the last symbol 220 of the current cell 601.

The calculation is as follows, including the case if defidle=½, the result for nxtidle is the final value of nxtidle after the sequence of these formulas. So as to allow integer only calculations some of the formula given here uses maxidle for the double of defidle.

nxtidle:=trunc(defidle)

if (trefvalid=TRUE)∧(GA=tref)

then nxtidle:=defidle−(nxtidle−defidle)

else if (trefvalid=FALSE)∨(tref∈ALIG)

then nxtidle:=trunc(sgn(trg2*2+gravis2)*chg2+1+ maxidle*2)/4 else nxtidle:=max(0,sgn(trg2)*trunc(chgappr)+minis)

State transitions from the fine alignment state to the cell locked state can be controlled as follows.
When (last−first)≤rangein is identified during a contiguous sequence of entrlock number of cell cycles 604 or $APP_{ga}$ qualified the link 221 $L_{GA,ga}$ to the cell locked state, the state of all links 221 $L_{GA,gax}$ with (trg−rangein/2)≤diffoffset$_{gax}$≤(trg+rangein/2)

or for simpler calculation (trg2−rangein)≤diffoffset$_{gax}$*2≤(trg2+rangein)

is changed from the fine alignment state to the cell locked state.

If abs(diffoffset$_{ga}$)≥rangeout is identified for a link 221 which is in the cell locked state then the link 221 has to be immediately declared as unavailable for the arbitration and its state demoted to fine or coarse alignment state as appropriate.

State transitions from the coarse alignment state to the fine alignment state can be controlled as follows.

When starting a link 221, the computing apparatuses 101 at either end transmit cells 601 corresponding to the assignments for the coarse alignment state as specified in the table of FIG. 18. The coarse alignment state of a link 221 persists while the cell starts 227 are misaligned beyond a certain limit. In the example embodiment the maximum allowable misalignment during the fine alignment is around ±100 symbol periods 225 due to the symbol position of the last control symbol C2 in the cell 601, see the table of FIG. 16. Before qualifying for the fine alignment state the alignment has to be better than ±100 to all members of the already aligned subset {$APP_{ga}$: ga∈ALIG}. When this is achieved the computing apparatus 101 changes to transmit that it has fine alignment state on the link 221. If the computing apparatus 101 on the other end of the link 221 also transmits that it has the fine alignment state for this link 221, in the next cell period 603 both computing apparatuses 101 change the cell 601 format to use the assignments of table of FIG. 17.

A detailed description of an example for the network interface building block follows.

Figure 14:
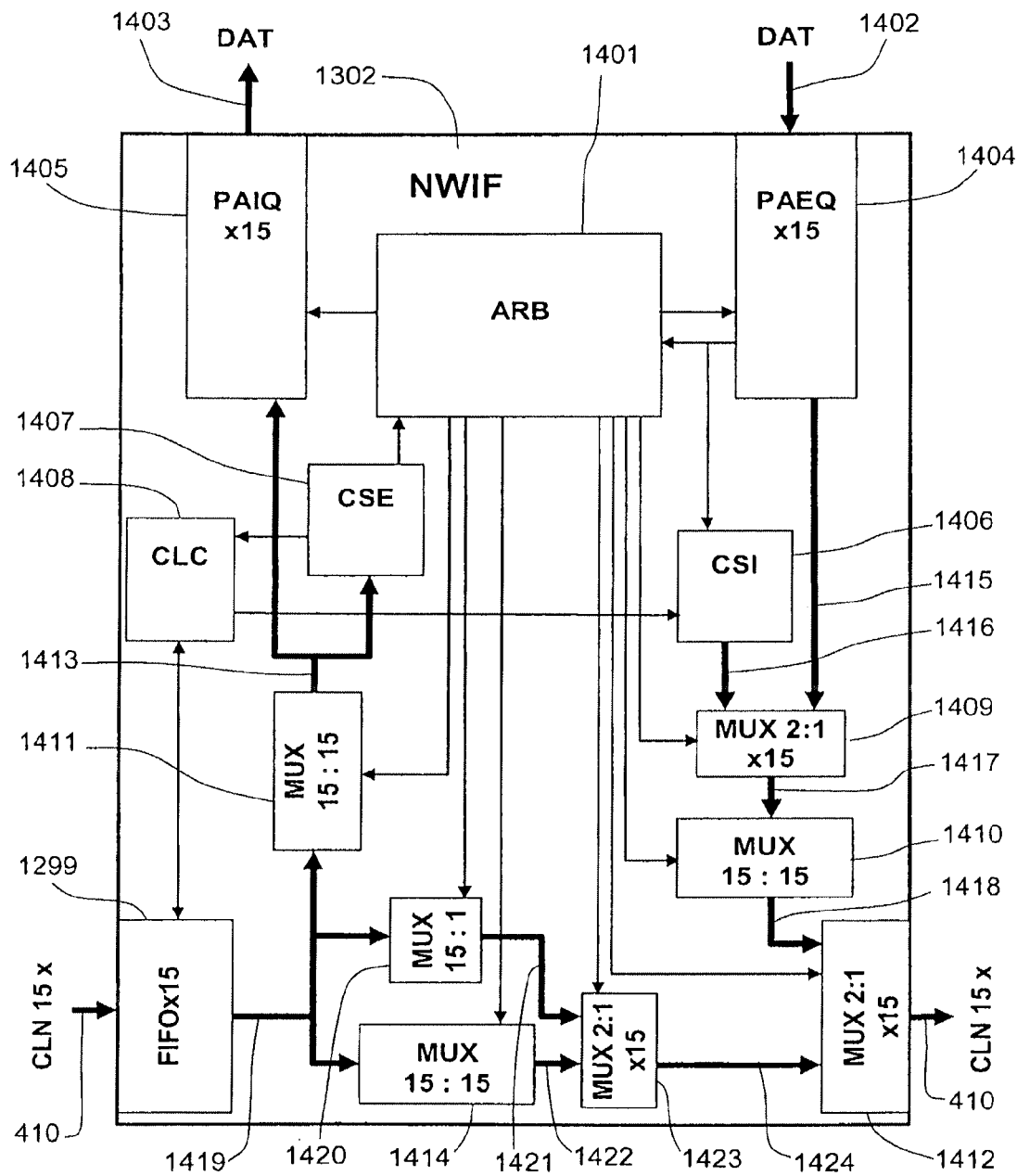
FIG. 14 shows a schematic block diagram of a network interface for an embodiment.

FIG. 14 shows a block diagram for the network interface (NWIF) 1302 of the example embodiment. See FIG. 13 for the position of this function in the computing apparatus 101.

The NWIF 1302 building block presents interfaces towards the WRP 1310 building block via the protocol agnostic egress queues (PAEQ×15) 1404 and the protocol agnostic ingress queues (PAIQ×15) 1405. The 15 individual egress and ingress queues are each associated with the geographic address 106 of a connected computing apparatus 101. These queues are under control of an arbiter (ARB) 1401. The ARB 1401 informs the individual queues after a cell period 603 about how many cell loads of payload 704 have been received and transmitted respectively. On the other hand, the ARB 1401 is informed about the amount of transmittable data available in the egress queues 1404.

The cell locked network interface input signals are connected to a FIFO×15 1299 building block which buffers and aligns the received data streams so that the received data stream is available on the internal path 1419 synchronous to the local symbol rate and aligned so that it has a pre-defined offset to the cell 601 transmission generated by the computing apparatus 101. The FIFO×15 1299 building block contains all functions which are required for the input symbol stream buffering and re-timing. A cell locking control (CLC) 1408 building block is specifically responsible for the insertion of the right number of idle symbols 210.

The input data stream of 15 connections available on the path 1419 is routed to three building blocks. A multiplexer (MUX15:15) 1411 building block which sorts the input data streams to match the ingress queues PAIQ×15 1405 which are assigned in the order of the geographic address 106 of the connected computing apparatuses 101. Cell payload 704 is delivered through this multiplexer to the corresponding ingress queue in PAIQ×15 1405. The control symbols 805 are extracted from the input data streams by the control symbol extractor (CSE) 1407 building block. The data stream of $APP_{gacpr}$ is selected by a multiplexer (MUX15:1) 1420. The input data streams are resorted to the respective output paths for the role of the forwarding agent computing apparatus 101 in a multiplexer (MUX15:15) 1414. Another multiplexer (MUX2:1×15) 1423 supports the forwarding of control symbols 805, a common control is used for these multiplexers and the control symbols 805 from $APP_{gacpr}$ are available as one of the inputs to each of the multiplexers in MUX2:1×15 1423.

The CSE 1407 building block collects offset 226 information, the requirements and capabilities, and other information from the control symbol 805 positions of the received cell. These are provided to the ARB 1401 and the CLC 1408 building block respectively.

The data streams of the egress queues PAEQx15 1404 do not contain control information for the cells 601. The control information from the egress queues PAEQx15 1404 is routed to a control symbol insertion (CSI) 1406 building block and to the ARB 1401. The CLC 1408 building block also provides information to the CSI 1406.

The multiplexer (MUX2:1×15) 1409 inserts the control symbols 805 from the CSI 1406 into the data streams coming from the egress queues PAEQx15 1404.

The data paths of the MUX2:1×15 1409 are ordered per geographic address 106, so they have to be reordered according to the assignments of the external links 221. This is done in the MUX15:15 1410.

The output symbol streams are either sourced by the computing apparatus 101 itself via the MUX15:15 1410 or by the forwarded data streams which are available via the MUX2:1×15 1423. The multiplexer array MUX2:1×15 1412 has individual control for each of the 2:1 multiplexers.

The control symbols 805 which are provided by the control symbol insertion CSI 1406 building block are missing from the output of the multiplexer array 1423. These control symbols 805 are passed through the MUX2:1×15 1409 and the MUX15:15 1410, and the MUX2:1×15 1412 is controlled so that the symbols transmitted via the path 1418 are selected at the proper control symbol 805 positions.

It is noted that building blocks of FIG. 14 which carry "×15" in their identification consist of 15 identical devices which are installed in parallel.

The MUX15:15 1411 and MUX15:15 1410 multiplexer arrays do not necessarily exist physically. At some point, depending on the implementation, the data queues appear as addressable entities which can be very flexibly allocated, especially without the need to use storage constrained to a specific order of assignment.

In the followings more details are given how the symbol positions of the cell 601 are assigned in the example embodiment.

The symbol positions from 1 through 1025 are assigned to C1-C24, D1-D975, and W1-W26 for the cell formats CF1 702 and CF2 703 as shown in the table of FIG. 16.

The control symbols 805 are positioned in the cell 601 according to the principle of FIG. 8. The number of payload data symbols 803 between the control symbol positions 805 is 24. The payload forwarding offset 706 from cell format CF1 702 to cell format CF2 703 is 25 symbol periods 225.

In the table of FIG. 16 the control symbol positions 805 C1-C2 are shown in merged boxes to emphasize that these are identically assigned for both cell formats CF1 702 and CF2 703. The symbols assigned as W1-W2 include symbols of the W 705 area and control symbol positions 805 which cannot be turned to D symbols due to the binding to the payload forwarding offset 706.

Despite the scattered and cell format dependent placement of the W1-W26 positions they could be all assigned for IP transmissions.

The C1-C2 control symbol positions 805 are assigned as two groups, both in the grid of 25 symbols. The first group C1-C4 is assigned in the early phase of the cell 601 while C5-C24 in the later phase of the cell 601. Important is, that after C24 there is enough time left to execute the arbitration.

The table in FIG. 17 shows an assignment of the control symbols 805 C1-C24 in the cell 601 during the cell locked state and the fine alignment state of a link 221 in the embodiment. The last column of the table shows for which states the respective specifications apply. The symbols C1 to C24 are assigned as follows:

C1: The cell start symbol 209 COM.

C2: This position can be used for the transmission of a packet for information which is constant or changing at a low rate. A computing apparatus 101 transmits the packet with one symbol 222 per cell 601 in this control symbol position 805. The RST symbol is used to signal the start of the packet. After RST the subsequent cells 601 contain the sequentially next symbol of the packet. At the end of the packet the PST symbol is transmitted to signalize to all other computing apparatuses 101 that the next packet starts in the next cell 601. The table in FIG. 18 provides the assignments for the packet content. A receiver should ignore the received symbols 223 in this control symbol position until the PST or the RST symbol is detected. This example embodiment fixes the length of the packet and provides a usage as an information block with the assignments given in the table of FIG. 19.

C3: Used for forwarding the C2 control symbol 805 received from $APP_{gacpr}$.

C4: This control symbol 805 carries the cell offset measurement data 226 as a signed 8-bit integer value. This value is evaluated and transmitted individually for each link 221. When the value exceeds the ±127 range, then a binary pattern "1000 0000" is transmitted which identifies the coarse alignment state, and in this case the table of FIG. 18 is used instead of the table of FIG. 17.

C5: This control symbol 805 provides full functionality information for the links 221 to the computing apparatuses 101 with the geographic address 106 in the range of 1 through 8. The bit assignments are given in the table of FIG. 21. The full functionality bit must be immediately negated for a link 221 which is broken or for whatever reason lost its locked state. The bit position allocated to the computing apparatus's own geographic address 106 is set to a "1" if the computing apparatus 101 declares to be the timing reference for the cell locked network 410, else the bit is cleared to "0".

C6: Used for forwarding the C5 control symbol 805 received from $APP_{gacpr}$.

C7: This control symbol provides full functionality information for the links 221 to the computing apparatuses 101 with the geographic address 106 in the range of 9 through 16. The bit assignments are given in the table of FIG. 21. The full functionality bit must be immediately negated for a link 221 which is broken or for whatever reason lost its locked state. The bit position allocated to the computing apparatus's 101 own geographic address 106 is set to a "1" if the computing apparatus 101 declares to be the timing reference for the cell locked network 410, else the bit is cleared to "0".

C9, C11, C13, C15, C17, C19, C21, C23: These control symbol positions 805 carry the transmission request codes. Each symbol 805 contains the transmission request code for two transmission targets, the positions being associated per geographic address 106. In the code position for the transmitting computing apparatus's 101 own geographic address 106 the four bits are used for transmitting bits 3 . . . 0 of gacpr which is the geographic address 106 of the cyclic predecessor computing apparatus 101 $APP_{gacpr}$. In the fine alignment state S8 309 these control symbols 805 are ignored.

C10, C12, C14, C16, C16, C18, C20, C22, C24: These control symbol positions 805 carry redundancy support for the transmission request codes. The control code received in the preceding control symbol position 805 from $APP_{gacpr}$ is retransmitted in these positions via all active links 221. In the fine alignment state S8 309 these control symbols 805 are unused and ignored.

The table in FIG. 18 shows an assignment of the control symbols 805 C1-C24 in the cell 601 only for the coarse alignment state of a link 221 in the embodiment. It has to be considered, that this format may be used in an asymmetric situation when the link 221 connects a computing apparatus 101 which is in the coarse alignment state to a computing apparatus 101 which has links 221 in the fine alignment state and/or in the locked state. This table has to be used by both computing apparatuses 101 at either end of the link 221 when the link 221 is in the coarse alignment state. The symbols C1 to C24 are assigned as follows:

C1: The cell start symbol 209 COM.

C2: Carries the geographic address 106 and clock quality information, according to the P2 entry of the table of FIG. 19.

C4: In the coarse alignment state 308 the binary code "1000 0000" is transmitted. With any other value in C4 the table of FIG. 17 is valid instead of the table of FIG. 18.

C5, C7: Identical to the table of FIG. 17. This is the resource to identify the set of the locked links 221.

C9, C11, C13, C15, C17, C19, C21, C23: These control symbol positions are used during the coarse alignment of a link 221 to exchange state information in every cell 601 without relying on any level of the cell 601 alignment. The encoding of the state information is the same as in the packet used during the fine aligned state or the locked state.

C3, C6, C8, C10, C12, C14, C16, C16, C18, C20, C22, C24: Can be ignored,

FIG. 19 shows the packet content table. The packet content transmission as well as establishing their synchronous operation should happen fully automatically. The following content is defined for this example embodiment:

P1: The RST symbol signals the beginning of the packet.

P2 bits 3 . . . 0: Bits 3 . . . 0 of the geographic address 106 of this computing apparatus 101. The cell locked networking 410 relies on the identification of the connected computing apparatuses 101 per unique geographic address 106. The connected computing apparatuses 101 identify the connections of their links 221 by detecting the geographic address 106 code transmitted via this symbol position.

P2 bits 7 . . . 4: Clock quality code. The computing apparatus 101 with the best clock, i.e. the one with the least value in this position could be used as a basis for the cell 601 alignment. This clock quality information is not evaluated in this embodiment.

P3: Management Bus using IPMI message bytes. IPMI standard based management can be supported via an I²C bus emulation using this symbol position. This way a separate hardware implementation of an I²C based management bus can be avoided. The received value for the I²C bus signaling architecture can be reconstructed from the data received in this position from all the other computing apparatuses 101 in the cell locked network 410.

P4 to P11: State information for the computing apparatuses' 101 connections ordered per geographic address 106. Two 4-bit state codes per symbol position are provided. The assignment of the state codes is given in the table of FIG. 20. The value in the position of the computing apparatus's 101 own geographic address 106 is unused and set to "0000".

P12: The last symbol of the packet is the pre-start symbol PST. Here the SKP symbol is specified for this function. When another computing apparatus 101 detects the PST symbol it should start its packet transmission with the RST symbol transmission in the next cell 601.

FIG. 19 shows the state of the connections table. The states are identified by 4-bit codes. The states of the links 221 are identified from no signal to cell locked state. Additionally the symbol rate tolerance measurement information is included.

FIG. 20 shows a table of the encoding of the bits which show the full functionality of the links 221 from the viewpoint of the transmitting computing apparatus 101. The full functionality is signaled by a "1" in the bit position according to the geographic address 106 of the connected computing apparatuses 101. These bits reflect most up-to-date conditions so as to avoid the assignment of non-functional paths 215 by the arbitration procedure. When a computing apparatus 101 is going to leave the cell locked network 410 it negates these bits prior to the disconnection of the computing apparatus 101 so as to avoid corrupted data transmission.

The bit position for the computing apparatus's 101 own geographic address 106 is assigned to signal whether the computing apparatus 101 provides the clocking reference in the network 410.

FIG. 22 shows a table for the transmission request codes. So as to keep the overhead for control in limits, the transmission requests are coded into 4 bits per target computing apparatus 101. Although the presented embodiments include an arbitration procedure which is limited to the case of a single cell 601 capability per cell period 603, this encoding is presented in a form which does allow higher bandwidth connections. In the case if higher numbers of transmissions are requested for a transmission path, it is highly probable that additional data ready for transmission appears after the computation of the request codes and prior to the start of the next cell period 603. Therefore, higher values of transmission requests may be issued. Depending on the priority level of the pending transmissions it is also possible to use the next lower request boundary to avoid a possible waste of bandwidth. The remaining transmission requests are then pending for the subsequent cell period 603.

In the following, an exemplary arbitration procedure described in connection with the embodiments is explained in more detail. The following symbolic are used:

x stands for any of the geographic addresses 106: 1≤x≤N $APP_x$ stands for the computing apparatus 101 with the geographic address 106 x.

N is the maximum number of computing apparatuses 101 supported by the embodiment.

dec( ) is the decrement function mod is the modulo operator nxt( ) is the function which determines the cyclic successor:

$$nxt(x):=(x \bmod N)+1$$

pred( ) is the function which determines the cyclic predecessor:

$$pred(x):=((x+N-2) \bmod N)+1$$

$APP_g$ stands for the computing apparatus 101 for which the description is applied.

g is the geographic address 106 of the computing apparatus 101 $APP_g$, 1≤g≤N.

Consider that the identification of the paths 215 appears as indirect because they are numbered according to the geographic address 106 of the respective connected computing apparatuses 101.

The arbitration input parameters are written to the table:

RCODE[1 . . . N,1 . . . N] for 4-bit codes as specified in the table of FIG. 22.

A[1 ... N,1 ... N] for single bit number values showing transmission path 215 availability.

The arbitration results appear in the following tables, for each computing apparatus 101 individually:

OUT[1 ... N] for signed number values

IN[1 ... N] for signed number values

The computing apparatus 101 provides egress queues 1404 and ingress queues 1405 for each connected computing apparatus 101 according the respective geographic address 106.

The first index of the tables RCODE[1 ... N,1 ... N] and A[1 ... N,1 ... N] is the source computing apparatus's 101 geographic address 106 while the second index is the target computing apparatus's 101 geographic address 106.

OUT[x] identifies the source for the path 215 $APP_g \rightarrow APP_x$.

If OUT[x]=x then the egress queue 1404 of $APP_g$ is selected as the source of the data for the path 215 $APP_g \rightarrow APP_x$. This realizes a transmission via the direct connection link 221.

If OUT[x]≠x and OUT[x]>0 then $APP_g$ is the source of the data, $APP_x$ is used as a forwarding agent, and $APP_{OUT[x]}$ is the target computing apparatus 101 to which the data is being transmitted. Therefore in $APP_g$ the egress queue 1404 for $APP_{OUT[x]}$ is to be selected as the source of the data for the path 215 $APP_g \rightarrow APP_x$.

If OUT[x]≠-x and OUT[x]<0 then $APP_g$ is a forwarding agent and $APP_g$ has to forward the data received from $APP_{-OUT[x]}$ to the path 215 $APP_g \rightarrow APP_x$.

IN[x] identifies the source computing apparatus 101 from which data is expected via the input path 215 $APP_x$ $APP_g$.

If IN[x]≠-x then the expected data is sourced directly by the $APP_x$ and has cell format CF1 702.

If IN[x]≠x and IN[x]>0 then $APP_g$ is a forwarding agent and it receives data from $APP_x$ in cell format CF1 702 which is to be forwarded to $APP_{IN[x]}$ in cell format CF2 703.

If IN[x]≠-x and IN[x]<0 then $APP_g$ is the target of a data transmission via a forwarding agent. The data arriving via the input path 215 $APP_x \rightarrow APP_g$ is sourced by $APP_{-IN[x]}$ and has cell format CF2 703.

It is noted that in both tables the positive numbers are associated with cell format CF1 702 while the negative numbers with cell format CF2 703.

It is further noted that the arbitration procedure itself is independent of whether computing apparatuses 101 with a specific geographic address 106 are present or not, the path 215 availability matrix A[1 ... N,1 ... N] already covers the information by marking the corresponding paths 215 as unavailable.

The exemplary arbitration procedure comprises the following steps:

Arbitration Step 1: The transmission request codes are available in table RCODE[1 ... N,1 ... N]. The transmission path availability matrix for single bit numbers A[1 ... N,1 ... N] is filled with the number of the available paths 215: 1 for available paths 215 and 0 for unavailable paths 215.

Arbitration Step 2: For each source $APP_s$ and target $APP_t$ the encoded value in RCODE[s,t] is converted to the number of the required cell 601 transmissions and is stored in R[s,t].

Arbitration Step 3: The direct connection is assigned as a default to all paths 215.

for t through 1 ... N simultaneously:

OUT[t]:=t for s through 1 ... N simultaneously:

IN[s]:=s

Arbitration Step 4: For each R[s,t] position of the table R, executed simultaneously: if R[s,t]>0 then one transmission request for the corresponding source-target pair is assigned to the direct transmission path 215 from $APP_s$ to $APP_t$. The direct connection is established via the default setting for all paths 215, so there is no need to change IN[1 ... N] or OUT[1 ... N]. The assigned paths 215 are marked busy and the R[s,t] values are decremented:

for all values of s and t simultaneously:

if (R[s,t])>0) then A[s,t]:=∅ if (R[s,t])>0) then dec(R[s,t])

Arbitration Step 5: This is the initialization step assigning each computing apparatus 101 to be in the forwarding agent function, assigned to the geographic address 106 m. The source computing apparatus 101 s is assigned to the geographic address 106 with the forwarding agent function's cyclic successor. The initial target computing apparatus 101 t is assigned as the cyclic successor of the source computing apparatus 101. It is forbidden to assign the computing apparatus 101 with the geographic address 106 f as a possible target, because the relevant path is available to be allocated in the case when the forwarding agent is assigned as the source in another, parallel executed procedure.

m:=g s:=nxt(m)

t:=nxt(s)

f:=pred(m)

Arbitration Step 6: The cases for each computing apparatus 101 as a forwarding agent are computed concurrently, step by step. Each arbitration step uses updated values of the complete parallel executed prior step. Note that in each step every forwarding agent is tested against a different source.

If A[s,m]>0 then with t starting at its current value and then applying t:=nxt(t) until R[s,t])>0 and A[m,t]>0 and t≠f is fulfilled. This is done within the current single step. If no such value exists then t:=0. If a value is found for t then a forwarding agent is identified and the links 221 are assigned as follows:

if t>0 then assign:

if s=g then OUT[m]:=t if m=g then IN[s]:=t if m=g then OUT[t]:=-s if t=g then IN[m]:=-s dec(R[s,t])

A[s,m]:=0

A[m,t]:=0

Arbitration Step 7: The next source computing apparatus 101 is assigned as well as the corresponding forbidden target. The values are individually different per forwarding agent.

$s:=nxt(s)$ $t:=nxt(s)$ $f:=pred(f)$

Arbitration Step 8: Continue at Arbitration Step 6 until s arrives at m. That is:

if s≠m then goto 'Arbitration Step 6' else end

More explanation is needed for Arbitration Step 6:

Each computing apparatus 101 executes this arbitration step simultaneously with each computing apparatus 101 in the role of the forwarding agent, but the IN and OUT tables are maintained only for the case when the result relates to $APP_s$.

The above described arbitration procedure incurs the possibility of significant imbalance in terms of the satisfaction of transmission requests depending on the constellation of the transmission requests and the assignments of the target computing apparatuses 101. These effects can be significantly mitigated if the arbitration is subdivided into two or three iterations where the first two iteration steps allocate only a limited number of transmissions per source to target relation.

The following convention regulates the transmission sequence assignments.

In the full mesh network 105 of N computing apparatuses 101 the computing apparatuses 101 provide N−1 output paths 215 and N−1 input paths 216 as well as protocol agnostic egress and ingress queues respectively for these paths. Each path for itself needs that a consistent sequence specification is adhered to in support of the multi route transmissions between any two computing apparatuses 101.

If the transmitter was assigned in addition to the direct transmission path to a target computing apparatus 101 also paths via forwarding agent computing apparatuses 101 then the transmitter distributes segments of the data destined to the target so that the first segment is assigned to the direct connection path and the subsequent segments are assigned in the sequence of the increasing geographic address 106 of the forwarding agent computing apparatuses 101. The target computing apparatus 101 stores the received data to its ingress queue 1405 for data received from the respective source computing apparatus 101 starting with the segment which comes via the direct connection path 215 followed by subsequent data segments in the increasing order of the geographic address 106 of the involved forwarding agent computing apparatuses 101.

In summary, a computing apparatus, and method have been described for acquiring and maintaining cell locked data transfer amongst a number of computing apparatuses which can be full mesh interconnected by full duplex data transfer links, as well as an apparatus which disseminates arbitration relevant information across the network and resources of the apparatus are controlled to execute multipath data transfers using the results of a replicated arbitration procedure. A predefined number of symbols transmitted as a cell is followed by a variable number of idle symbols to ensure the nominally simultaneous start of the cell transfers throughout the network without a central control. At specific positions of the cells each computing apparatus broadcasts a list of its transmission requests, receiver capabilities, and blocked resources to all other computing apparatuses. Each of the interconnected computing apparatuses executes the same arbitration procedure based on the identical data set of transmission requests, receiver capabilities, and blocked resources. As a result transmission paths are assigned for direct transmission and for payload forwarding. The transmission paths can be assigned per cell period individually for both directions of each link. Several packet protocols assigned over the cell transmission layer can coexist in the network.

It is noted that the present invention can be implemented or used in any meshtype network structure. The described memory device may be implemented in the receiver for each link of an apparatus.

The design process for the implementation of said computing apparatus (101) may start with the creation of a source code which may be written in a hardware description language or created via a schematic design tool. The source code may exist in two levels, the first called the behavioural level code, the second called the register transfer level (RTL) code, software representations of said computing apparatus (101) may be created at both levels. A computer with simulation software is used for the functional verification of the design wherein the data set for the simulation includes one or more instances of the software representation of said computing apparatus (101); a system level simulation using more than one instantiation of said computing apparatus (101) corresponds the above described operation of said computing apparatuses (101) in a network (410). The RTL level source code can be converted in a process called synthesis, to a data set comprising a list of elementary components and a list of interconnects for a target manufacturing technology. The target technology can be a programmable logic device (PLD) in which case the data set may appear as a bit stream which is used for the configuration of the PLD in a production process or provided on a product via a storage device and uploaded to the PLD for configuration upon power up of the entity which comprises the PLD. The configured PLD or a device built using said data set in said target manufacturing technology are instantiations of said computing apparatus (101).

The embodiments can be realized in hardware, software, or a combination of hardware and software. They can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The embodiments also can be embedded in an application product, which comprises all the features enabling the implementation of the methods described herein, and which when loaded in a processing system is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). Accordingly, the above predetermined embodiments may vary within the scope of the attached claims.

The invention claimed is:

1. An apparatus comprising:
   at least two communication means represented as conduits providing bidirectional links for independent streams of cells comprising a predefined number of symbols;
   at least two resources, said at least two resources include paths and other components serving symbol transmission; and
   an arbiter,
   said apparatus is adapted to perform active and passive communication and form a network via said at least two communication means with two or more other apparatuses compatible to said apparatus;
   said apparatus is adapted to identify subdivisions of time as activity periods, wherein said activity periods are represented as cell periods used for locked evaluation of said symbols, wherein said symbols transmitted during said cell period constitute a cell,
   wherein said other apparatuses compatible to said apparatus further comprise a first apparatus and a second apparatus, wherein said apparatus is adapted to receive within one activity period any two elements of active communication issued by said first apparatus connected via at least one of said at least two communication means to said apparatus in said network, said apparatus is adapted to forward received communication elements to at least said second apparatus of said other apparatuses connected via said at least one of at least two communication means to said apparatus in said network within the activity period of their issuance;
   said at least two resources having at least two statuses being determined for a subsequent activity period by said arbiter;
   said other apparatuses are adapted to disseminate their own request messages via each of said at least two communication means, further said other apparatuses are adapted to disseminate status messages via each of said at least two communication means which inform said apparatus about the status and/or future status of said resources of said other apparatuses, said request and status messages being disseminated by said apparatus and said other apparatuses within the network using said at least two communication means so that said apparatus and said other apparatuses in said network will have received each of said disseminated request and status messages within the activity period of said dissemination of said request and status messages;
   said arbiter of said apparatus is adapted to use content of said disseminated request and status messages issued by said other apparatuses connected via said at least two communication means as an input and to compute the statuses for the subsequent activity period(s) in said network,
   wherein said apparatus and at least two of said other apparatuses comprise at least one target apparatus, at least one requester apparatus, and at least one forwarding agent apparatus, said request messages carry requests for payload transmission specifying the number of said cells required for said payload transmission per said at least one target apparatus, said status messages include receiving capability information for each link, said arbiter assigning requested payload transmissions to paths directly connecting said at least one requester apparatus to at least one target apparatus as well as assigning at least one forwarding agent apparatus together with respective paths from said at least one requester apparatus to said at least one forwarding agent apparatus and from said at least one forwarding agent apparatus to said at least one target apparatus, said paths being specified as directed components of said links, said assignment restricted to the case when said number of cells required for said payload transmission promotes and said respective paths are available for the assignment,
   said apparatus is adapted to extract the status assignments of the at least two resources of said apparatus for the subsequent activity period exclusively from the results of said apparatus's arbiter, said arbiter adapted to perform computations and assignments in each activity period;
   said apparatus is adapted:
      to transmit said payload using a first subset of symbols of a streamed cell to said at least one target apparatus or said at least one forwarding agent apparatus via a respective connecting cell locked link; and
      to receive said payload as said target apparatus or as said forwarding agent apparatus using said first subset of symbols of a cell via a respective connecting cell locked link, wherein the assignment of said at least one forwarding agent apparatus is restricted so that pairs of otherwise unallocated paths of cell locked links are used to transmit forwarded payload using a second subset of symbols of a cell as said at least one forwarding agent apparatus and receive payload using said second subset of symbols of a cell as said at least one target apparatus; wherein said second subset of symbols of a cell can be within the cell period of said first subset of symbols of a cell or within a cell period thereafter.

2. The apparatus according to claim 1, wherein said apparatus is further adapted to apply a convention on the distribution and reassembly of payload streams when said arbiter assigned more than one transmission route from a requester apparatus to a target apparatus, said convention being followed by each of said apparatuses interconnected in a cell locked network, said convention being based on predefined priority orders of the data paths, the optionally multiple lanes of the data paths, and apparatuses assigned as forwarding agents involved in the transmission of the segments of data, said priority orders being optionally based on unique identification numbers assigned to the apparatuses.

3. The apparatus according to claim 1, wherein said apparatus is adapted to transmit and receive multiple cells per cell period via a subset of said bidirectional links, by:
   means of operating subsets of the bidirectional links at multiples of a basic symbol rate, by means of-using multiple parallel lanes comprising the link, or a combination of both;
   wherein when transmitting the corresponding higher number of symbols per symbol period of the basic symbol rate, each symbol position within the basic symbol period is assigned to the corresponding symbol position of one of multiple interleaved cells.

4. The apparatus according to claim 1, wherein said arbiter is enhanced for the support of network topologies with higher bandwidth on a subset of the bidirectional links, said arbiter is adapted to assign said cell transmissions required for said payload transmission per target apparatus to resources in the following sequence:

assign transmissions using the direct paths from requester to target apparatus;

assign transmissions with forwarding agent apparatuses using only higher bandwidth links;

assign transmissions with forwarding agent apparatus using one higher bandwidth link; and assign any remaining transmissions.

5. The apparatus according to claim 1, wherein the arbiter is adapted to apply an arbitration procedure for the networked apparatuses considered as a cyclic ordered set of elements, with one specific cyclic order being used when applying said arbitration procedure, the elements being aware of relative positions of other elements in said specific cyclic order and each of said elements executing the identical arbitration procedure and also each of said elements executing said arbitration procedure based on the same data set of requirements and capabilities and other features of said elements and their interrelations, said arbitration procedure being carried out in a sequence of execution cycles wherein the resources or other goods are allocated in concurrent execution steps, with each of said elements used as a starting point for one of said concurrent execution steps, after each of said concurrent execution steps an updated data set being used for the subsequent execution step and each execution step producing subsets of the result of said arbitration procedure where said execution steps generate elements of the result for said arbitration procedure considering said finite set of elements in the sequence of said specific cyclic order of those elements starting at the cyclical successor of said respective starting point and ending with the cyclic predecessor of said respective starting point in a comparison to a selected element of said ordered set with the exclusion of the respective starting point and the cyclic predecessor of the element being considered.

6. The apparatus according to claim 1, wherein said apparatus is adapted to utilize symbols which are transmitted or retransmitted as payload via a cell locked network, for a packet protocol, a storage interface protocol or any other higher level protocol, and further adapted to identify the protocol via an allocated symbol in a predefined symbol position or via a sequence of symbols.

7. A method of transferring data in a network having three or more computing apparatuses via conduits providing bidirectional links for independent streams of symbols in both directions, wherein said method comprises:

providing said three or more computing apparatuses, wherein each of said computing apparatuses comprises:
at least two communication means represented as conduits providing bidirectional links for independent streams of cells comprising a predefined number of symbols;
at least two resources, said at least two resources include paths and other components serving symbol transmission; and
an arbiter,
wherein each of said computing apparatuses is adapted to perform active and passive communication and form the network via said at least two communication means with two or more other instances of said computing apparatuses compatible with said computing apparatus, wherein said three or more computing apparatuses comprise at least a first computing apparatus, a second computing apparatus, and a third computing apparatus;

identifying subdivisions of time as activity periods, wherein said activity periods are represented as cell periods used for locked evaluation of said symbols;

receiving, by the first computing apparatus, within one activity period any two elements of active communication issued by said second computing apparatus in said network;

forwarding, by said first computing apparatus, communication elements received from the second computing apparatus to the third computing apparatus in said network within the activity period of their issuance;

determining, by said first computing apparatus, a status for a subsequent activity period;

disseminating, by said first computing apparatus, request messages and status messages which inform about the status and/or future status of resources, said messages being disseminated so that other computing apparatuses in said network will have received each of said messages from said first computing apparatus within the activity period of their issuance, wherein said request messages carry requests for payload transmission specifying the number of cells required for said payload transmission per target apparatus, said status messages include receiving capability information for each link, assigning, by said first computing apparatus, requested payload transmissions to paths directly connecting a requester apparatus to a target apparatus as well as assigning additional computing apparatuses as forwarding agent apparatuses together with the respective paths from said requester apparatus to said forwarding agent apparatus and from said forwarding agent apparatus to said target apparatus, said paths being specified as directed components of said links;

using the content of said disseminated request and status messages as an input;

computing the statuses for the subsequent activity period or periods for all resources of all computing apparatuses in said network;

extracting status assignments of own resources for the subsequent activity period exclusively from the results of the own arbiter, said arbiter producing results in each activity period;

transmitting, by said first computing apparatus, a subset of symbols of a cell as payload to said second computing apparatus via a cell locked link;

receiving, by said first computing apparatus, said subset of symbols of a cell as payload from said second computing apparatus via a cell locked link;

retransmitting, by said first computing apparatus, said subset of symbols received from said second computing apparatus as a source and said third computing apparatus as the target of a transmission, receiving, by said third computing apparatus, said retransmission of said subset of symbols, the retransmission of said subset of symbols taking place either in the cell period of its reception or in the cell period thereafter.

* * * * *